US012759261B2

(12) United States Patent
Wang et al.

(10) Patent No.: US 12,759,261 B2
(45) Date of Patent: Oct. 13, 2026

(54) MULTILAYER NONWOVEN STRUCTURE

(71) Applicant: Borealis AG, Vienna (AT)

(72) Inventors: Jingbo Wang, Linz (AT); Markus Gahleitner, Linz (AT); Klaus Bernreitner, Linz (AT); Henk Van Paridon, Beringen (BE); Gustaf Tobieson, Stenungsund (SE); Wilhelmus Henricus Adolf Sars, Geleen (NL); Anita Luyten, Beringen (BE); Pascal Wust, Burghausen (DE); Onur Uzun, Gayrettepe (TR)

(73) Assignee: Borealis AG, Vienna (AT)

(*) Notice: Subject to any disclaimer, the term of this patent is extended or adjusted under 35 U.S.C. 154(b) by 147 days.

(21) Appl. No.: 18/292,572

(22) PCT Filed: Aug. 2, 2022

(86) PCT No.: PCT/EP2022/071689
§ 371 (c)(1),
(2) Date: Jan. 26, 2024

(87) PCT Pub. No.: WO2023/012159
PCT Pub. Date: Feb. 9, 2023

(65) Prior Publication Data

US 2025/0083409 A1 Mar. 13, 2025

(30) Foreign Application Priority Data

Aug. 4, 2021 (EP) .................................... 21189680

(51) Int. Cl.
*B32B 5/26* (2006.01)
*B01D 39/16* (2006.01)
(Continued)

(52) U.S. Cl.
CPC ............ *B32B 5/269* (2021.05); *B01D 39/163* (2013.01); *B32B 5/022* (2013.01); *B32B 7/027* (2019.01);
(Continued)

(58) Field of Classification Search
CPC ......... B32B 5/269; B32B 5/022; B32B 7/027; B32B 2250/20; B32B 2250/40;
(Continued)

(56) References Cited

U.S. PATENT DOCUMENTS

| | | | |
|---|---|---|---|
| 10,087,575 | B2 | 10/2018 | Tynys et al. |
| 2010/0029162 | A1 | 2/2010 | Datta |

(Continued)

FOREIGN PATENT DOCUMENTS

| | | | |
|---|---|---|---|
| CN | 105899553 | A | 8/2016 |
| CN | 106255718 | A | 12/2016 |

(Continued)

OTHER PUBLICATIONS

Office Action with English translation for Chinese Patent Application No. 202280052762.9 issued Aug. 23, 2025, 25 pages.
(Continued)

*Primary Examiner* — Jeremy R Pierce
(74) *Attorney, Agent, or Firm* — Lowenstein Sandler LLP

(57) ABSTRACT

A nonwoven fabric (NF) comprising a multilayer structure that comprises: i) at least one meltblown layer (M) comprising melt blown fibers (MBF) comprising a first propylene polymer (PP1) having: a) an amount of 2,1-regiodefects in the range from 0.0 to 0.1 mol-%; and b) a melting temperature Tm in the range from 155 to 170° C., ii) at least one spunbonded layer (S) comprising spunbonded fibers (SBF) comprising a second propylene polymer (PP2) having: a) an amount of 2,1-regiodefects in the range from 0.4 to 1.5 mol-%; and b) a melting temperature Tm in the range
(Continued)

Hydrohead and Tensile strength properties at different calender temperatures for the inventive and comparative nonwoven fabrics from 145 to 160° C. wherein the melting temperature of the first polypropylene polymer Tm (PP1) is at least 5.0° C. higher than that of the second first polypropylene polymer Tm (PP2).

16 Claims, 1 Drawing Sheet

(51) Int. Cl.

| | |
|---|---|
| ***B32B 5/02*** | (2006.01) |
| ***B32B 7/027*** | (2019.01) |
| ***C08F 10/06*** | (2006.01) |
| ***D04H 1/4291*** | (2012.01) |
| ***D04H 1/4374*** | (2012.01) |
| ***D04H 1/56*** | (2006.01) |
| ***D04H 3/16*** | (2006.01) |

(52) U.S. Cl.
CPC ........... *C08F 10/06* (2013.01); *D04H 1/4291* (2013.01); *D04H 1/4374* (2013.01); *D04H 1/56* (2013.01); *D04H 3/16* (2013.01); *B01D 2239/0618* (2013.01); *B01D 2239/0622* (2013.01); *B01D 2239/0627* (2013.01); *B01D 2239/065* (2013.01); *B01D 2239/1291* (2013.01); *B32B 2250/03* (2013.01); *B32B 2250/20* (2013.01); *B32B 2250/40* (2013.01); *B32B 2262/0253* (2013.01); *B32B 2307/30* (2013.01); *B32B 2307/718* (2013.01); *D10B 2321/022* (2013.01); *D10B 2501/04* (2013.01); *D10B 2505/04* (2013.01); *D10B 2509/026* (2013.01)

(58) Field of Classification Search
CPC ........ B32B 2262/0253; B32B 2307/30; B32B 2307/718; B01D 39/163; B01D 2239/0618; B01D 2239/0622; B01D 2239/0627; B01D 2239/065; B01D 2239/1291; C08F 10/16; D04H 1/4291; D04H 1/4374; D04H 1/56; D04H 3/16; D10B 2321/022; D10B 2501/04; D10B 2505/04; D10B 2509/026
See application file for complete search history.

(56) References Cited

U.S. PATENT DOCUMENTS

| | | | | |
|---|---|---|---|---|
| 2013/0212993 | A1 | 8/2013 | Tynys et al. | |
| 2016/0333175 | A1 | 11/2016 | Wang et al. | |
| 2017/0166711 | A1 | 6/2017 | Boragno | |
| 2019/0284739 | A1* | 9/2019 | Wang | D04H 1/559 |
| 2020/0165425 | A1* | 5/2020 | Gahleitner | C08F 210/16 |
| 2020/0270434 | A1* | 8/2020 | Van Houcke | C08L 23/12 |

FOREIGN PATENT DOCUMENTS

| | | | | |
|---|---|---|---|---|
| EP | 887379 | A1 | 12/1998 | |
| EP | 887380 | A1 | 12/1998 | |
| EP | 887381 | A1 | 12/1998 | |
| EP | 991684 | A1 | 4/2000 | |
| EP | 1028984 | A1 | 8/2000 | |
| EP | 2610270 | A1 | 3/2013 | |
| EP | 2610272 | A1 | 7/2013 | |
| EP | 2610271 | B1 | 3/2019 | |
| WO | 9212182 | A1 | 7/1992 | |
| WO | 9414856 | A1 | 7/1994 | |
| WO | 9512622 | A1 | 5/1995 | |
| WO | 9858977 | A1 | 12/1998 | |
| WO | 9924478 | A1 | 5/1999 | |
| WO | 9924479 | A1 | 5/1999 | |
| WO | 0068314 | A1 | 11/2000 | |
| WO | 0068315 | A1 | 11/2000 | |
| WO | 200202576 | A1 | 1/2002 | |
| WO | 2004000899 | A1 | 12/2003 | |
| WO | 2004111095 | A1 | 12/2004 | |
| WO | 2006097497 | A1 | 9/2006 | |
| WO | 2007116034 | A1 | 10/2007 | |
| WO | 2009103750 | A2 | 8/2009 | |
| WO | 2011076780 | A1 | 6/2011 | |
| WO | 2011092092 | A2 | 8/2011 | |
| WO | 2012007430 | A1 | 1/2012 | |
| WO | 2012001052 | A3 | 3/2012 | |
| WO | 2012084961 | A1 | 6/2012 | |
| WO | WO-2012126973 | A1 * | 9/2012 | D04H 3/00 |
| WO | 2011135004 | A3 | 10/2012 | |
| WO | 2015082379 | A1 | 6/2015 | |
| WO | 2015158790 | A2 | 10/2015 | |
| WO | 2017055173 | A1 | 4/2017 | |
| WO | 2018104388 | A1 | 6/2018 | |
| WO | 2018122134 | A1 | 7/2018 | |
| WO | 2019179959 | A1 | 9/2019 | |
| WO | WO-2020088996 | A1 * | 5/2020 | C08L 23/12 |

OTHER PUBLICATIONS

International Search Report and Written Opinion for PCT/EP2022/071689 mailed Sep. 28, 2022, 12 pages.
European Search Report for European Patnet Application No. 21189680.8 dated Feb. 4, 2022, 7 pages.
Zweifel et al. Plastic Additives Handbook Zweifel (2001), 5th Edition; pp. 871-873 ; Coloration of Styrenic and Acrylic Polymers.
Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134.
Busico, et al., "Microstructure of polypropylene," Progress in Polymer Science, vol. 26, 2001, pp. 443-533.
Busico, et al., "Full Assignment of the 13C NMR Spectra of Regioregular Polypropylenes: Methyl and Methylene Region," Macromolecules, 1997, vol. 30, pp. 6251-6263, American Chemical Society.
Zhou, et al., "A new decoupling method for accurate quantification of polyethylene copolymer composition and triad sequence distribution with 13C NMR," Journal of Magnetic Resonance, vol. 187, 2007, pp. 225-233.
Resconi, et al., "Selectivity in Propene Polymerization with Metallocene Catalysts," Chem. Rev., 2000, vol. 100, pp. 1253-1345.
Wang, et al., "Structural Analysis of Ethylene/Propylene Copolymers Synthesized with a Constrained Geometry Catalyst," Macromolecules, 2000, vol. 33, pp. 1157-1162.
Cheng, H.N., "C NMR Analysis of Ethylene-Propylene Rubbers," Macromolecules, 1984, vol. 17, 1984, pp. 1950-1955.

* cited by examiner

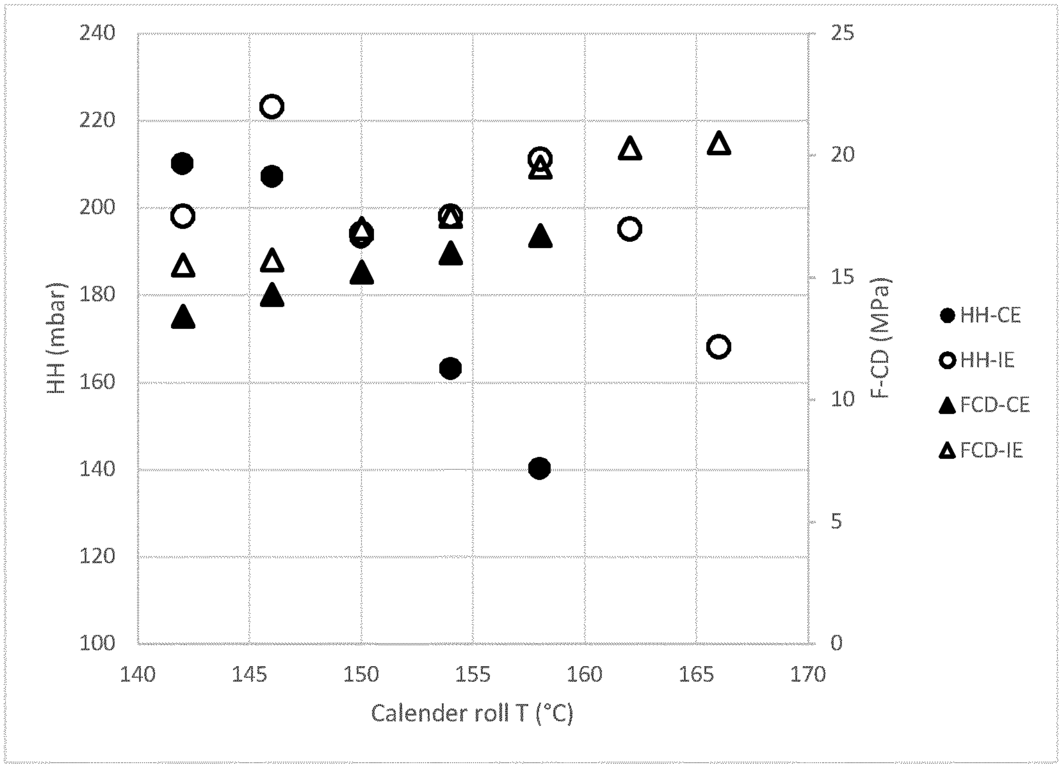
Figure 1: Hydrohead and Tensile strength properties at different calender temperatures for the inventive and comparative nonwoven fabrics

MULTILAYER NONWOVEN STRUCTURE

CROSS-REFERENCE TO RELATED APPLICATION(S)

The present application is a national stage entry under 35 U.S.C. § 371 of International Application No. PCT/EP2022/071689, filed on Aug. 2, 2022, which claims priority to European Patent Application No. 21189680.8, filed on Aug. 4, 2021. The contents of these applications are hereby incorporated by reference in their entirety.

FIELD OF THE INVENTION

The present invention is directed to a nonwoven fabric (NF) comprising at least one melt blown layer (M) in combination with at least one spunbonded layer (S), said layer (M) comprising melt blown fibers and said layer (S) comprising spunbonded fibers, wherein said melt blown fibers and said spunbonded fibers comprise propylene polymers. The present invention is further directed to an article comprising said nonwoven fabric (NF).

BACKGROUND TO THE INVENTION

Nonwoven polypropylene webs are widely used in filtration and hygiene. In the field of nonwoven polypropylene webs, multilayer structures such as spunbonded/melt blown/spunbonded (SMS) multilayer structures are commonly used since different requirements must be combined. For example, in the classic SMS structure for hygiene articles, the spunbonded layer is used as support and provides the mechanical properties, and the melt blown layer is much thinner and used mainly as functional layer. A good SMS structure should have the combination of good mechanical properties and good barrier properties. SMS structures are very popular in hygiene articles due to their excellent performance at low production cost.

SMS structures are currently produced in a sequential process wherein the first spunbonded layer is made via a first spinneret and the melt blown layer is subsequently deposited on top of the spunbonded layer by means of a melt blown beam, and the second spunbonded layer is further deposited on top of the melt blown layer with a second spinneret so that the three layers are bonded together to obtain the SMS structure. Since these process steps are rather challenging, the properties of the polypropylenes for the spunbonded and the melt blown layers must be adapted accordingly.

In recent years, there is an increasing spotlight on reducing the impact of plastic waste on the environment. In many cases, this can be achieved through recycling the waste polyolefin to produce new articles in a circular economy. Since SMS structures are typically used in hygiene articles, recycling and/or reuse of the articles is impractical, therefore it is desirable to reduce the impact of these articles through reducing the amount of polymer present, i.e. by producing SMS structures with a particularly low grammage (weight per area of fabric).

For example, WO 2018/104388 A1 discloses a multilayer nonwoven fabric comprising melt blown (M) and spunbonded (S) layers in an SMMS structure, all layers comprising polypropylenes based on Ziegler-Natta (ZN) catalysts. The hydrohead of the resulting fabrics is, however, still insufficient. Furthermore, WO 2011/092092 A1 and WO 2015/082379 A1 both disclose melt blown fibres and webs from polypropylene homo- and copolymers based on Ziegler-Natta (ZN) catalysts, for which a similarly insufficient performance in multilayer nonwoven fabrics can be assumed.

Thus, there is a need in the art for SMS structures comprising polypropylene showing good barrier properties while the mechanical properties remain on a high level. Furthermore, the grammage should be beneficially low without compromising these properties Accordingly, it is an object of the present invention to provide a Nonwoven fabric (NF) featured by excellent barrier and mechanical properties and low grammage.

SUMMARY OF THE INVENTION

The finding of the present invention is that a SMS structure comprising a spunbonded layer made of a polypropylene prepared in the presence of a single site catalyst and a melt blown layer made of a polypropylene produced in the presence of a Ziegler-Natta catalyst is featured by an increased hydrohead and improved mechanical properties.

Therefore, the present invention is directed to a nonwoven fabric (NF), comprising a multi-layer structure comprising i) at least one melt blown layer (M) comprising melt blown fibers (MBF) comprising a first propylene polymer (PP1) having:
   a) an amount of 2,1-regiodefects, as determined by $^{13}$C-NMR spectroscopic analysis, in the range from 0.0 to 0.1 mol-%; and
   b) a melting temperature $T_m$, determined by differential scanning calorimetry (DSC), in the range from 155 to 170° C.,
ii) at least one spunbonded layer (S) comprising spunbonded fibers (SBF) comprising a second propylene polymer (PP2) having:
   a) an amount of 2,1-regiodefects, as determined by $^{13}$C-NMR spectroscopic analysis, in the range from 0.4 to 1.5 mol-%; and
   b) a melting temperature $T_m$, determined by differential scanning calorimetry (DSC), in the range from 145 to 160° C.

wherein the melting temperature of the first polypropylene polymer $T_m$ (PP1) is at least 5.0° C. higher than that of the second first polypropylene polymer $T_m$ (PP2).

In a further embodiment, the present invention is directed to a process for producing the nonwoven fabric of the invention, comprising the steps of:

a) producing the first spunbonded layer (S1) by depositing spunbonded fibers (SBF) through a spinneret,
b) optionally producing at least one further spunbonded layer (S) by depositing spunbonded fibers (SBF) on the first spunbonded layer (S1) obtained in step a) through at least one further spinneret, thereby obtaining a multilayered structure comprising two or more, like two or three spunbonded layers (S) in sequence,
c) producing the first melt blown layer (M1) by depositing melt blown fibers (MBF) on the first spunbonded layer (S1) obtained in step a) or on the outermost spunbonded layer (S) obtained in step b) through an extruder, thereby obtaining a multilayered structure comprising one or more, like one, two or three spunbonded layer(s) (S) and a melt blown layer (M) in sequence,
d) optionally producing at least one further melt blown layer (M) by depositing melt blown fibers (MBF) on the first melt blown layer (M1) obtained in step c) through at least one further extruder, thereby obtaining a multilayered structure comprising one or more, like one, two or three spunbonded layer(s) (S) and two or more, like two or three melt blown layer(s) (M) in sequence, e) producing the second spunbonded layer (S2) by depositing spunbonded fibers (SBF) through a spinneret on the first melt blown layer (M1) obtained in step c) or on the outermost melt blown layer (M) obtained in step d), thereby obtaining a multilayered structure comprising one or more, like one, two or three spunbonded layer(s) (S), one or more, like one, two or three melt blown layer(s) (M), and one spunbonded layer (S) in sequence, and f) optionally producing at least one further spunbonded layer (S) by depositing spunbonded fibers (SBF) on the second spunbonded layer (S2) obtained in step e) through at least one further spinneret, thereby obtaining a multilayered structure comprising one or more, like one, two or three spunbonded layer(s) (S), one or more, like one, two or three melt blown layer(s) (M), and two or more, like one, two or three spunbonded layer(s) (S) in sequence.

The present invention is further directed to an article, comprising the nonwoven fabric (NF) as described above, wherein the article is selected from filtration medium (filter), diaper, sanitary napkin, panty liner, incontinence product for adults, protective clothing, surgical drape, surgical gown, and surgical wear.

BRIEF DESCRIPTION OF THE DRAWINGS

FIG. 1 is a graph illustrating the Hydrohead and Tensile strength properties at different calender temperatures for the inventive and comparative nonwoven fabrics of the Examples.

Definitions

Unless defined otherwise, all technical and scientific terms used herein have the same meaning as commonly understood by one of ordinary skill in the art to which the invention pertains. Although, any methods and materials similar or equivalent to those described herein can be used in practice for testing of the present invention, the preferred materials and methods are described herein. In describing and claiming the present invention, the following terminology will be used in accordance with the definitions set out below.

Unless clearly indicated otherwise, use of the terms "a," "an," and the like refers to one or more.

According to the present invention, the expression "propylene homopolymer" relates to a polypropylene that consists substantially, i.e. of at least 99.0 mol-%, more preferably of at least 99.5 mol-%, still more preferably of at least 99.8 mol-%, like of at least 99.9 mol-%, of propylene units. In another embodiment, only propylene units are detectable, i.e. only propylene has been polymerized.

A propylene random copolymer is a copolymer of propylene monomer units and comonomer units, preferably selected from ethylene and C4-C12 alpha-olefins, in which the comonomer units are distributed randomly over the polymeric chain. The propylene random copolymer can comprise comonomer units from one or more comonomers different in their amounts of carbon atoms. In the following amounts are given in mol-% unless it is stated otherwise.

Typical for propylene homopolymers and propylene random copolymers is the presence of only one glass transition temperature.

DETAILED DESCRIPTION

The Nonwoven Fabric (NF)

The nonwoven fabric (NF) according to the present invention comprise at least one melt blown layer (M) and at least one spunbonded layer (S).

Preferably, the nonwoven fabric (NF) is a multi-layer construction like an SMS-web comprising, a spunbonded layer (S), a melt blown layer (M) and another spunbonded layer (S).

According to the present invention, the terms "SMS-web" or "SMS structure" are interchangeable and stand for a multilayer structure comprising at least one melt blown layer (M) and at least one spunbonded layer (S) obtained by depositing each layer on the subsequent layer.

Alternatively, the multi-layer construction can also include a multiplicity of melt blown web layers (M) and spunbonded web layers (S), such as a SSMMS structure.

It is therefore preferred that the multilayer structure comprises, more preferably consists of, the following layers in the given order:

i) at least one spunbonded layer (S) comprising spunbonded fibers (S);
ii) at least one melt blown layer (M) comprising melt blown fibers (M); and
iii) at least one spunbonded layer (S) comprising spunbonded fibers (S), wherein each instance of the spunbonded layer (S) may be the same or different and each instance of the melt blown layer (M) may be the same or different.

It is especially preferred that the nonwoven fabric (NF) is a SSMMS construction, i.e. consists of two melt blown layers (M) enclosed by three spunbonded layers (S). Thus, it is particularly preferred that the multilayer structure consists of the following layers in the given order:

i) two spunbonded layer (S) comprising spunbonded fibers (S);
ii) two melt blown layer (M) comprising melt blown fibers (M); and
iii) one spunbonded layer (S) comprising spunbonded fibers (S), wherein each instance of the spunbonded layer (S) may be the same or different and each instance of the melt blown layer (M) may be the same or different.

It is particularly preferred that each instance of the spunbonded layer (S) is the same and/or each instance of the melt blown layer (M) is the same. In one embodiment, each instance of the spunbonded layer (S) is the same and each instance of the melt blown layer (M) is the same.

As outlined above, the nonwoven fabric (NF) according to the instant invention is featured by high barrier properties. Accordingly, it is preferred that the hydrohead of the nonwoven fabric (NF) is at least 100 mbar, more preferably at least 130 mbar, still more preferably 160 mbar.

The weight per unit area of the nonwoven fabric (NF) depends very much on the end use, however it is preferred that the nonwoven fabric has a weight per unit area (i.e. grammage), determined according to ISO 536:1995, in the range from 6.0 to 100 g/$m^2$, more preferably in the range from 9.0 to 50 g/$m^2$, most preferably in the range from 12 to 20 g/$m^2$.

As outlined above, the nonwoven fabric (NF) according to the instant invention is featured by high mechanical properties. Accordingly, it is preferred that the tensile strength of the nonwoven fabric (NF) in the crossmachine direction (F-CD) is at least 100 N/5 cm, more preferably at least 150 N/5 cm, still more preferably 180 N/5 cm.

The nonwoven fabric (NF) may be obtained in a sequential process comprising the steps a) producing the first spunbonded layer (S1) by depositing spunbonded fibers (SBF) through a spinneret, b) optionally producing at least one further spunbonded layer (S) by depositing spunbonded fibers (SBF) on the first spunbonded layer (S1) obtained in step a) through at least one further spinneret, thereby obtaining a multilayered structure comprising two or more, like two or three spunbonded layers (S) in sequence, c) producing the first melt blown layer (M1) by depositing melt blown fibers (MBF) on the first spunbonded layer (S1) obtained in step a) or on the outermost spunbonded layer (S) obtained in step b) through an extruder, thereby obtaining a multilayered structure comprising one or more, like one, two or three spunbonded layer(s) (S) and a melt blown layer (M) in sequence, d) optionally producing at least one further melt blown layer (M) by depositing melt blown fibers (MBF) on the first melt blown layer (M1) obtained in step c) through at least one further extruder, thereby obtaining a multilayered structure comprising one or more, like one, two or three spunbonded layer(s) (S) and two or more, like two or three melt blown layer(s) (M) in sequence, e) producing the second spunbonded layer (S2) by depositing spunbonded fibers (SBF) through a spinneret on the first melt blown layer (M1) obtained in step c) or on the outermost melt blown layer (M) obtained in step d), thereby obtaining a multilayered structure comprising one or more, like one, two or three spunbonded layer(s) (S), one or more, like one, two or three melt blown layer(s) (M), and one spunbonded layer (S) in sequence, and f) optionally producing at least one further spunbonded layer (S) by depositing spunbonded fibers (SBF) on the second spunbonded layer (S2) obtained in step e) through at least one further spinneret, thereby obtaining a multilayered structure comprising one or more, like one, two or three spunbonded layer(s) (S), one or more, like one, two or three melt blown layer(s) (M), and two or more, like one, two or three spunbonded layer(s) (S) in sequence.

As outlined above, it is preferred that the nonwoven fabric (NF) consists of two melt blown layers (M) enclosed by three spunbonded layers (S).

Thus, it is especially preferred that the nonwoven fabric (NF) is obtained in a sequential process comprising the steps a) producing a first spunbonded layer (S1) by depositing spunbonded fibers (SBF) through a spinneret, b) producing a further spunbonded layer (Sla) by depositing spunbonded fibers (SF) through a spinneret on the first spunbonded layer (S1) obtained in step a), thereby obtaining a multilayered structure comprising two spunbonded layers (S)

c) producing a first melt blown layer (M1) by depositing melt blown fibers (MBF) on the further spunbonded layer (Sla) obtained in step b) through an extruder, thereby obtaining a multilayered structure comprising two spunbonded layers (S) and one melt blown layer (M) in sequence, d) producing a second melt blown layer (M2) by depositing melt blown fibers (MBF) on the first melt blown layer (M1) obtained in step c) through a further extruder, thereby obtaining a multilayered structure comprising two spunbonded layers (S) and two melt blown layers (M) in sequence, and e) producing a second spunbonded layer (S2) by depositing spunbonded fibers (SBF) through a spinneret on the second melt blown layer (M2) obtained in step d), thereby obtaining a multilayered structure comprising two spunbonded layers (S), two melt blown layers (M) and one spunbonded layer (S) in sequence.

The present invention is further directed to a process for producing the nonwoven fabric (NF) as described above and below, comprising, more preferably consisting of, the steps of:

a) producing the first spunbonded layer (S1) by depositing spunbonded fibers (SBF) through a spinneret, b) optionally producing at least one further spunbonded layer (S) by depositing spunbonded fibers (SBF) on the first spunbonded layer (S1) obtained in step a) through at least one further spinneret, thereby obtaining a multilayered structure comprising two or more, like two or three spunbonded layers (S) in sequence, c) producing the first melt blown layer (M1) by depositing melt blown fibers (MBF) on the first spunbonded layer (S1) obtained in step a) or on the outermost spunbonded layer (S) obtained in step b) through an extruder, thereby obtaining a multilayered structure comprising one or more, like one, two or three spunbonded layer(s) (S) and a melt blown layer (M) in sequence, d) optionally producing at least one further melt blown layer (M) by depositing melt blown fibers (MBF) on the first melt blown layer (M1) obtained in step c) through at least one further extruder, thereby obtaining a multilayered structure comprising one or more, like one, two or three spunbonded layer(s) (S) and two or more, like two or three melt blown layer(s) (M) in sequence, e) producing the second spunbonded layer (S2) by depositing spunbonded fibers (SBF) through a spinneret on the first melt blown layer (M1) obtained in step c) or on the outermost melt blown layer (M) obtained in step d), thereby obtaining a multilayered structure comprising one or more, like one, two or three spunbonded layer(s) (S), one or more, like one, two or three melt blown layer(s) (M), and one spunbonded layer (S) in sequence, and f) optionally producing at least one further spunbonded layer (S) by depositing spunbonded fibers (SBF) on the second spunbonded layer (S2) obtained in step e) through at least one further spinneret, thereby obtaining a multilayered structure comprising one or more, like one, two or three spunbonded layer(s) (S), one or more, like one, two or three melt blown layer(s) (M), and two or more, like one, two or three spunbonded layer(s) (S) in sequence.

As outlined above, it is preferred that the nonwoven fabric (NF) consists of two melt blown layers (M) enclosed by three spunbonded layers (S).

Thus, it is especially preferred that the process for producing the nonwoven fabric (NF) of the present invention comprises, more preferably consists of, the steps of:

a) producing a first spunbonded layer (S1) by depositing spunbonded fibers (SBF) through a spinneret, b) producing a further spunbonded layer (Sla) by depositing spunbonded fibers (SF) through a spinneret on the first spunbonded layer (S1) obtained in step a), thereby obtaining a multilayered structure comprising two spunbonded layers (S)

c) producing a first melt blown layer (M1) by depositing melt blown fibers (MBF) on the further spunbonded layer (Sla) obtained in step b) through an extruder, thereby obtaining a multilayered structure comprising two spunbonded layers (S) and one melt blown layer (M) in sequence, d) producing a second melt blown layer (M2) by depositing melt blown fibers (MBF) on the first melt blown layer (M1) obtained in step c) through a further extruder, thereby obtaining a multilayered structure comprising two spunbonded layers (S) and two melt blown layers (M) in sequence, and e) producing a second spunbonded layer (S2) by depositing spunbonded fibers (SBF) through a spinneret on the second melt blown layer (M2) obtained in step d), thereby obtaining a multilayered structure comprising two spunbonded layers (S), two melt blown layers (M) and one spunbonded layer (S) in sequence.

In the following, the melt blown layer (M) and the spunbonded layer (S) are described in more detail.

The Melt Blown Layer (M)

As outlined above, the nonwoven fabric (NF) according to the present invention comprises at least one melt blown layer (M), said melt blown layer (M) comprising melt blown fibers (MBF).

Preferably, the melt blown fibers (MBF) make up at least 80 wt.-% of the melt blown layer(s) (M), more preferably at least 90 wt.-%, still more preferably at least 95 wt.-%. It is especially preferred that the melt blown layer(s) (M) consist of the melt blown fibers (MBF).

The melt blown fibers (MBF) are obtained from a first propylene polymer (PP1).

The first propylene polymer (PP1) can be a propylene copolymer or a propylene homopolymer, the latter being preferred.

In case the first propylene polymer (PP1) is a propylene copolymer, the first propylene polymer (PP1) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably the first propylene polymer (PP1) according to this invention comprises, especially consists of, monomers copolymerizable with propylene from the group consisting of ethylene, 1-butene and 1-hexene. More specifically the first propylene polymer (PP1) of this invention comprises—apart from propylene—units derivable from ethylene and/or 1-butene. In a preferred embodiment, the first propylene polymer (PP1) comprises units derivable from ethylene and propylene only.

The comonomer content of the first propylene polymer (PP1) is preferably in the range from 0.0 to 5.0 mol-%, yet more preferably in the range from 0.0 to 3.0 mol-%, still more preferably in the range from 0.0 to 1.0 mol-%, most preferably in the range from 0.0 to 0.5 mol-%.

It is especially preferred that the first propylene polymer (PP1) is a first propylene homopolymer (H-PP1).

One preferred requirement of the first propylene polymer (PP1), like the first propylene homopolymer (H-PP1) is its rather high melt flow rate, which differ(s) from other polymers used for instance in the melt blown technique to produce fibers. Accordingly, it is preferred that in the present invention the propylene homopolymer has a melt flow rate $MFR_2$ (final) (230° C./2.16 kg) measured according to ISO 1133 in the range from 450 to 2000 g/10 min. It is further preferred that the propylene homopolymer has a melt flow rate $MFR_2$ (final) (230° C./2.16 kg) measured according to ISO 1133 in the range from 700 to 1800 g/10 min, still more preferably in the range from 900 to 1600 g/10 min and most preferably in the range from 1100 to 1500 g/10 min.

Unless otherwise indicated, throughout the instant invention the term melt flow rate (230° C./2.16 kg) of the first propylene polymer (PP1), like the first propylene homopolymer (H-PP1), refers to the melt flow rate (230° C./2.16 kg) after visbreaking.

Thus, it is preferred that the first propylene polymer (PP1), like the first propylene homopolymer (H-PP1), has been visbroken.

Accordingly, the melt flow rate $MFR_2$ (initial) (230° C./2.16 kg), i.e. the melt flow rate before visbreaking, of the first propylene polymer (PP1), like the first propylene homopolymer (H-PP1), is much lower, like from 15 to 150 g/10 min. For example, the melt flow rate $MFR_2$ (initial) (230° C./2.16 kg) of the first propylene polymer (PP1), like the first propylene homopolymer (H-PP1), before visbreaking is from 30 to 120 g/10 min, like from 50 to 100 g/10 min.

In one embodiment of the present invention, the first propylene polymer (PP1), like the first propylene homopolymer (H-PP1), has been visbroken wherein the first propylene polymer (PP1), like the first propylene homopolymer (H-PP1), fulfils inequation (I):

$$7.0 < \frac{MFR(\text{final})}{MFR(\text{initial})} < 30.0 \quad \text{(I)}$$

wherein MFR(final) is the melt flow rate $MFR_2$ (230° C.) determined according to ISO 1133 after visbreaking and MFR(initial) is the melt flow rate MFR2 (230° C.) determined according to ISO 1133 before visbreaking.

More preferably, the first propylene polymer (PP1), like the first propylene homopolymer (H-PP1), fulfils inequation (Ia):

$$9.0 < \frac{MFR(\text{final})}{MFR(\text{initial})} < 25.0 \quad \text{(Ia)}$$

Still more preferably, the first propylene polymer (PP1), like the first propylene homopolymer (H-PP1), fulfils inequation (Ib):

$$10.0 < \frac{MFR(\text{final})}{MFR(\text{initial})} < 20.0 \quad \text{(Ib)}$$

Most preferably, the first propylene polymer (PP1), like the first propylene homopolymer (H-PP1), fulfils inequation (Ic):

$$11.0 < \frac{MFR(\text{final})}{MFR(\text{initial})} < 15.0 \quad \text{(Ic)}$$

It is further preferred that the first propylene polymer (PP1), like the first propylene homopolymer (H-PP1), fulfils inequation (II):

$$1.30 < \frac{MWD(\text{initial})}{MWD(\text{final})} < 2.00, \quad \text{(II)}$$

wherein MWD(final) is the molecular weight distribution (Mw/Mn), determined by Gel Permeation Chromatography, after visbreaking and MWD(initial) is the molecular weight distribution (Mw/Mn), determined by Gel Permeation Chromatography, before visbreaking.

More preferably, the first propylene polymer (PP1), like the first propylene homopolymer (H-PP1), fulfils inequation (IIa):

$$1.40 < \frac{MWD(\text{initial})}{MWD(\text{final})} < 1.90 \quad \text{(IIa)}$$

Still more preferably, the first propylene polymer (PP1), like the first propylene homopolymer (H-PP1), fulfils inequation (IIb):

$$1.50 < \frac{MWD(\text{initial})}{MWD(\text{final})} < 1.80 \quad \text{(IIb)}$$

Most preferably, the first propylene polymer (PP1), like the first propylene homopolymer (H-PP1), fulfils inequation (IIc):

$$1.60 < \frac{MWD(\text{initial})}{MWD(\text{final})} < 1.75 \quad \text{(IIc)}$$

As mentioned above, one characteristic of first propylene polymer (PP1), like the first propylene homopolymer (H-PP1), is that the first propylene polymer (PP1), like the first propylene homopolymer (H-PP1), has been visbroken. Preferred mixing devices suited for visbreaking are discontinuous and continuous kneaders, twin screw extruders and single screw extruders with special mixing sections and co-kneaders.

By visbreaking the first propylene polymer (PP1), like the first propylene homopolymer (H-PP 1), with heat or at more controlled conditions with peroxides, the molar mass distribution (MWD) becomes narrower because the long molecular chains are more easily broken up or scissored and the molar mass M, will decrease, corresponding to an $MFR_2$ increase. The $MFR_2$ increases with increase in the amount of peroxide which is used.

Such visbreaking may be carried out in any known manner, like by using a peroxide visbreaking agent. Typical visbreaking agents are 2,5-dimethyl-2,5-bis(tert.butyl-peroxy)hexane (DHBP) (for instance sold under the tradenames Luperox 101 and Trigonox 101), 2,5-dimethyl-2,5-bis(tert-.butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis (tert.butylperoxy-isopropyl)benzene (DIPP) (for instance sold under the tradenames Perkadox 14S and Luperox DC). Suitable amounts of peroxide to be employed in accordance with the present invention are in principle known to the skilled person and can easily be calculated on the basis of the amount of first propylene polymer (PP1), like the first propylene homopolymer (H-PP1), to be subjected to visbreaking, the $MFR_2$ (230° C./2.16 kg) value of the first propylene polymer (PP1), like the first propylene homopolymer (H-PP1), to be subjected to visbreaking and the desired target $MFR_2$ (230° C./2.16 kg) of the product to be obtained. Accordingly, typical amounts of peroxide visbreaking agent are from 0.005 to 0.7 wt.-%, more preferably from 0.01 to 0.4 wt.-%, based on the total amount of first propylene polymer (PP1), like the first propylene homopolymer (H-PP1), employed.

Typically, visbreaking in accordance with the present invention is carried out in an extruder, so that under the suitable conditions, an increase of melt flow rate is obtained. During visbreaking, higher molar mass chains of the starting product are broken statistically more frequently than lower molar mass molecules, resulting as indicated above in an overall decrease of the average molecular weight and an increase in melt flow rate.

The first propylene polymer (PP1), like the first propylene homopolymer (H-PP1), is preferably obtained by visbreaking the first propylene polymer (PP1), like the first propylene homopolymer (H-PP1), preferably visbreaking by the use of peroxide.

More precisely, the first propylene polymer (PP1), like the first propylene homopolymer (H-PP1), may be obtained by visbreaking the first propylene polymer (PP1), like the first propylene homopolymer (H-PP1), preferably by the use of peroxide as mentioned above, in an extruder.

Preferably, the first propylene polymer (PP1), like the first propylene homopolymer (H-PP1), is isotactic. Accordingly, it is preferred that the first propylene polymer (PP1), like the first propylene homopolymer (H-PP1), has a rather high pentad concentration (mmmm %) i.e. more than 92.0%, more preferably more than 92.5%, like more than 92.5 to 98.5%, still more preferably at least 93.0%, like in the range from 93.0 to 97.5%.

A further characteristic of the first propylene polymer (PP1), like the first propylene homopolymer (H-PP1), is the low amount of mis-insertions of propylene within the polymer chain, which indicates that the first propylene polymer (PP1), like the first propylene homopolymer (H-PP1), is produced in the presence of a Ziegler-Natta catalyst, preferably in the presence of a Ziegler-Natta catalyst (ZN—C) as defined in more detail below.

Accordingly, the first propylene polymer (PP1), like the first propylene homopolymer (H-PP1), is featured by low amount of 2,1 erythro regio-defects, i.e. in the range from 0.0 to 0.1 mol-%, determined by $^{13}C$-NMR spectroscopy. In an especially preferred embodiment no 2,1 erythro regio-defects are detectable.

It is preferred that the first propylene polymer (PP1), like the first propylene homopolymer (H-PP1), is featured by a xylene cold soluble (XCS) content in the range from 2.0 to 8.0 wt.-% Accordingly, the first propylene polymer (PP1), like the first propylene homopolymer (H-PP1), has preferably a xylene cold soluble content (XCS) in the range from 3.0 to 7.0 wt.-%, more preferably in the range from 4.0 to 6.0 wt.-%, still more preferably in the range from 4.5 to 5.5 wt.-%.

The amount of xylene cold solubles (XCS) additionally indicates that the first propylene polymer (PP1), like the first propylene homopolymer (H-PP1), is preferably free of any elastomeric polymer component, like an ethylene propylene rubber. In other words, the first propylene polymer (PP1), like the first propylene homopolymer (H-PP1), shall be not a heterophasic polypropylene, i.e. a system consisting of a polypropylene matrix in which an elastomeric phase is dispersed.

The amount of xylene cold solubles (XCS) additionally indicates that the first propylene polymer (PP1), like the first propylene homopolymer (H-PP1), preferably does not contain elastomeric (co)polymers forming inclusions as a second phase for improving mechanical properties. A polymer containing elastomeric (co)polymers as insertions of a second phase would by contrast be called heterophasic and is preferably not part of the present invention.

The presence of second phases or the so-called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly, it is preferred that the first propylene polymer (PP1), like the first propylene homopolymer (H-PP1), according to this invention has no glass transition temperature below −30° C., preferably below −25° C., more preferably below −20° C.

On the other hand, in one preferred embodiment the first propylene polymer (PP1), like the first propylene homopolymer (H-PP1), according to this invention has a glass transition temperature in the range from −12 to 5° C., more preferably in the range from −10 to 2° C.

Further, the first propylene polymer (PP1), like the first propylene homopolymer (H-PP1), is featured by a rather high weight molecular weight. Accordingly, it is preferred that the first propylene polymer (PP1), like the first propylene homopolymer (H-PP1), has a weight molecular weight Mw (initial) before visbreaking above 100,000 kg/mol, more preferably in the range from 100,000 to 200,000 kg/mol, still more preferably in the range from 110,000 kg/mol to 150,000 kg/mol.

Additionally or alternatively to the previous paragraph, it is preferred that the first propylene polymer (PP1), like the first propylene homopolymer (H-PP1), has an initial molecular weight distribution (Mw(initial)/Mn(initial)) before visbreaking above 4.0, more preferably in the range from 4.0 to 10.0, still more preferably in the range from 5.0 to 8.0.

As outlined above, it is preferred that the first propylene polymer (PP1), like the first propylene homopolymer (H-PP1) has been visbroken.

Accordingly, it is preferred that the first propylene polymer (PP1), like the first propylene homopolymer (H-PP1), has a final molecular weight distribution (Mw(final)/Mn (final)) after visbreaking in the range from 2.5 to 5.0, more preferably in the range from 3.0 to 4.5, most preferably in the range from 3.5 to 4.0.

Further, the first propylene polymer (PP1), like the first propylene homopolymer (H-PP1), is preferably a crystalline propylene homopolymer. The term "crystalline" indicates that the first propylene polymer (PP1), like the first propylene homopolymer (H-PP1), has a rather high melting temperature. Accordingly throughout the invention the first propylene polymer (PP1), like the first propylene homopolymer (H-PP1), is regarded as crystalline unless otherwise indicated.

The first propylene polymer (PP1), like the first propylene homopolymer (H-PP1), has a melting temperature $T_m$ measured by differential scanning calorimetry (DSC) in the range from 155 to 170° C., more preferably in the range from 156° C. to 165° C., most preferably in the range from 157° C. to 163° C.

Furthermore, the melting temperature $T_m$ of the first propylene polymer (PP1), like the first propylene homopolymer (H-PP1) is at least 5.0° C., more preferably at least 6.0° C., yet more preferably at least 7.0° C., still more preferably at least 8.0 C, most preferably at least 9.0° C., higher than the melting temperature $T_m$ of the second propylene polymer (PP2). The melting temperature $T_m$ of the first propylene polymer (PP1), like the first propylene homopolymer (H-PP1), is preferably no more than 30.0° C. higher than the melting temperature $T_m$ of the second propylene polymer (PP2).

Further it is preferred that the first propylene polymer (PP1), like the first propylene homopolymer (H-PP1), has a crystallization temperature $T_c$ measured by differential scanning calorimetry (DSC) of equal or more than 115° C., more preferably in the range from 115 to 130° C., more preferably in the range from 120 to 125° C.

The first propylene polymer (PP1), like the first propylene homopolymer (H-PP1), is preferably featured by high stiffness. Accordingly the first propylene polymer (PP1), like the first propylene homopolymer (H-PP1), preferably has a rather high tensile modulus. Accordingly it is preferred that the first propylene polymer (PP1), like the first propylene homopolymer (H-PP1), has a tensile modulus measured at 23° C. according to ISO 527-1 (cross head speed 1 mm/min) of at least 1,200 MPa, more preferably in the range from 1,200 to 2,000 MPa, still more preferably in the range from 1,300 to 1,800 MPa.

Preferably, the first propylene polymer (PP1), like the first propylene homopolymer (H-PP1), is obtained by polymerizing propylene in the presence of a Ziegler-Natta catalyst as defined below. More preferably, the first propylene polymer (PP1), like the first propylene homopolymer (H-PP1), according to this invention is obtained by a process as defined in detail below by using the Ziegler-Natta catalyst.

The first propylene polymer (PP1), like the first propylene homopolymer (H-PP1), can comprise, more preferably can consist of, two fractions, namely a first fraction of the first propylene polymer (PP1a) and a second fraction of the first propylene polymer (PP1b). Preferably the weight ratio between the first fraction of the first propylene polymer (PP1a) and the second fraction of the first propylene homopolymer (PP1b) [(PP1a):(PP1b)] is 70:30 to 40:60, more preferably 65:35 to 45:55.

The first fraction of the first propylene polymer (PP1a) and the second fraction of the first propylene homopolymer (PP1b) may differ in the melt flow rate. However, it is preferred that the melt flow rate $MFR_2$ (230° C.) of the first fraction of the first propylene polymer (PP1a) and of the second fraction of the first propylene homopolymer (PP1b) are nearly identical, i.e. differ not more than 15% as calculated from the lower of the two values, preferably differ not more than 10%, like differ not more than 7%.

The first propylene polymer (PP1), like the first propylene homopolymer (H-PP1), of the present invention may comprise further components. However, it is preferred that the inventive first propylene polymer (PP1), like the first propylene homopolymer (H-PP1), comprises as polymer components only the first propylene polymer (PP1), like the first propylene homopolymer (H-PP1), as defined in the instant invention. Accordingly, the amount of first propylene polymer (PP1), like the first propylene homopolymer (H-PP1), may not result in 100.0 wt.-% based on the total first propylene polymer (PP1), like the first propylene homopolymer (H-PP1). Thus, the remaining part up to 100.0 wt.-% may be accomplished by further additives known in the art. However, this remaining part shall be not more than 5.0 wt.-%, like not more than 3.0 wt.-% within the total first propylene polymer (PP1), like the first propylene homopolymer (H-PP1). For instance, the inventive first propylene polymer (PP1), like the first propylene homopolymer (H-PP1), may comprise additionally small amounts of additives selected from the group consisting of antioxidants, stabilizers, fillers, colorants, nucleating agents and antistatic agents. In general, they are incorporated during granulation of the pulverulent product obtained in the polymerization. Accordingly, the first propylene polymer (PP1), like the first propylene homopolymer (H-PP1), constitutes at least to 95.0 wt.-%, more preferably at least 97.0 wt.-% to the total first propylene polymer (PP1), like the first propylene homopolymer (H-PP1).

In case the first propylene polymer (PP1), like the first propylene homopolymer (H-PP1), comprises a $\alpha$-nucleating agent, it is preferred that it is free of $\beta$-nucleating agents. The $\alpha$-nucleating agent is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3, -trideoxy-4,6:5,7-bis-O-[(4-propylphenyl)methylene]-nonitol, and (iii) salts of diesters of phosphoric acid, e.g. sodium 2,2'-methylenebis (4,6, -di-tert-butylphenyl) phosphate or aluminium-hydroxy-bis[2,2'-methylene-bis(4,6-di-t-butylphenyl)phosphate], and (iv) vinylcycloalkane polymer and vinylalkane polymer (as discussed in more detail below), and (v) mixtures thereof.

Such additives are generally commercially available and are described, for example, in "Plastic Additives Handbook", pages 871 to 873, 5th edition, 2001 of Hans Zweifel.

Preferably, the first propylene polymer (PP1), like the first propylene homopolymer (H-PP1), contains up to 5.0 wt.-% of the $\alpha$-nucleating agent. In a preferred embodiment, the propylene homopolymer contains not more than 500 ppm, more preferably of 0.025 to 200 ppm, more preferably of 0.1 to 200 ppm, still more preferably 0.3 to 200 ppm, most preferably 0.3 to 100 ppm of a $\alpha$-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3, -trideoxy-4,6:5,7-bis-O-[(4-propylphenyl)methylene]-nonitol, sodium 2,2'-methylenebis (4,6,-di-tert-butylphenyl) phosphate, vinylcycloalkane polymer, vinylalkane polymer, and mixtures thereof.

As outlined above, the melt blown layer (M) according to the present invention comprises melt blown fibers (MBF) obtained from the first propylene polymer (PP1). The melt blown fibers (MBF) preferably comprise at least 95 wt.-%, based on the total weight of the melt blown fibers, of the first propylene polymer (PP1), like the first propylene homopolymer (H-PP1), as described above. It is especially preferred that the melt blown fibers (MBF) consist of the first propylene polymer (PP1), like the first propylene homopolymer (H-PP1).

More preferably, the melt blown layer (M) according to the present invention comprises a melt blown web (MBW) made of the melt blown fibers (MBF) as described above. It is preferred that the total grammage of the one or more melt blown layers (M), determined according to ISO 536:1995, is in the range from 0.8 to 30 g/m$^2$, more preferably in the range from 1.0 to 20 g/m$^2$, most preferably in the range from 1.2 to 10 g/m$^2$.

It is further preferred that each instance of the melt blown layer (M), more preferably each melt blown web (MBW), has a grammage determined according to ISO 536:1995 in the range from 0.4 to 15 g/m$^2$, 0.5 to 10 g/m$^2$, 0.6 to 5.0 g/m$^2$.

The first propylene polymer (PP1), like the first propylene homopolymer (H-PP1), according to this invention is preferably produced in the presence of (a) a Ziegler-Natta catalyst (ZN—C) comprising compounds (TC) of a transition metal of Group 4 to 6 of IUPAC, a Group 2 metal compound (MC) and an internal donor (ID);

(b) optionally a co-catalyst (Co), and (c) optionally an external donor (ED).

Preferably, the first propylene polymer (PP1), like the first propylene homopolymer (H-PP1), is produced in a single reactor, i.e. is unimodal.

Process for the Polymerization of PP1

The process for the preparation of the propylene homopolymer as well as the Ziegler-Natta catalyst (ZN—C) are further described in detail below.

As already indicated above, the first propylene polymer (PP1), like the first propylene homopolymer (H-PP1), is preferably produced in a single polymerization process.

In alternative embodiments, a sequential polymerization process may be employed.

The term "sequential polymerization system" indicates that the first propylene polymer (PP1), like the first propylene homopolymer (H-PP1), is produced in at least two reactors connected in series. Accordingly, such a polymerization system comprises at least a first polymerization reactor (R1) and a second polymerization reactor (R2), and optionally a third polymerization reactor (R3). The term "polymerization reactor" shall indicate that the main polymerization takes place. Thus, in case the process consists of two polymerization reactors, this definition does not exclude the option that the overall system comprises for instance a pre-polymerization step in a pre-polymerization reactor. The term "consist of" is only a closing formulation in view of the main polymerization reactors.

The first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention, the slurry reactor (SR) is preferably a (bulk) loop reactor (LR). Accordingly, the average concentration of the first propylene polymer (PP1), like the first propylene homopolymer (H-PP1), or the first fraction of the first propylene polymer (PP1a) if a sequential process is being used, in the polymer slurry within the loop reactor (LR) is typically from 15 wt.-% to 55 wt.-%, based on the total weight of the polymer slurry within the loop reactor (LR). In one preferred embodiment of the present invention the average concentration of the first propylene polymer (PP1), like the first propylene homopolymer (H-PP1), or the first fraction of the first propylene polymer (PP1a) if a sequential process is being used, in the polymer slurry within the loop reactor (LR) is from 20 wt.-% to 55 wt.-% and more preferably from 25 wt.-% to 52 wt.-%, based on the total weight of the polymer slurry within the loop reactor (LR).

If other reactors are present, then these reactors, e.g. the optional second polymerization reactor (R2) and the optional third polymerization reactor (R3) are gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

If a sequential process is being used, the propylene polymer of the first polymerization reactor (R1), i.e. the first fraction of the first propylene polymer (PP1a), more preferably the polymer slurry of the loop reactor (LR) containing the first fraction of the first propylene polymer (PP1a), is directly fed into the second polymerization reactor (R2), i.e. into the (first) gas phase reactor (GPR1), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR), the polymer slurry comprising the first fraction of the first propylene homopolymer (PP1a) is led directly to the next stage gas phase reactor.

Alternatively, the propylene polymer of the first polymerization reactor (R1), i.e. the first fraction of the propylene polymer (PP1a), more preferably polymer slurry of the loop reactor (LR) containing the first propylene homopolymer fraction (PP1a), may be also directed into a flash step or through a further concentration step before fed into the second polymerization reactor (R2), i.e. into the gas phase reactor (GPR). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

More specifically, the optional second polymerization reactor (R2), and any subsequent reactor, for instance the third polymerization reactor (R3), are preferably gas phase reactors (GPRs). Such gas phase reactors (GPR) can be any mechanically mixed or fluid bed reactors. Preferably, the gas phase reactors (GPRs) comprise a mechanically agitated fluid bed reactor with gas velocities of at least 0.2 m/sec. Thus, it is appreciated that the gas phase reactor is a fluidized bed type reactor preferably with a mechanical stirrer.

Thus, when a sequential polymerization process is used, it is preferred that the first polymerization reactor (R1) is a slurry reactor (SR), like loop reactor (LR), whereas the second polymerization reactor (R2) and any optional subsequent reactor, like the third polymerization reactor (R3), are gas phase reactors (GPRs). Accordingly in such a process at least two, preferably two polymerization reactors (R1) and (R2) or three polymerization reactors (R1), (R2) and (R3), namely a slurry reactor (SR), like loop reactor (LR) and a (first) gas phase reactor (GPR1) and optionally a second gas phase reactor (GPR2), connected in series are used. If needed prior to the slurry reactor (SR) a pre-polymerization reactor may be placed.

The Ziegler-Natta catalyst (ZN—C) is fed into the first polymerization reactor (R1) and is transferred with the polymer (slurry) obtained in the first polymerization reactor (R1) into the subsequent reactors, should any subsequent reactors be used. If the process covers also a pre-polymerization step it is preferred that all of the Ziegler-Natta catalyst (ZN—C) is fed in the pre-polymerization reactor. Subsequently the pre-polymerization product containing the Ziegler-Natta catalyst (ZN—C) is transferred into the first polymerization reactor (R1).

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Especially good results are achieved in case the temperature in the reactors is carefully chosen.

Accordingly it is preferred that the operating temperature in the first polymerization reactor (R1) is in the range from 62 to 85° C., more preferably in the range from 65 to 82° C., still more preferably in the range from 67 to 80° C.

Alternatively or additionally to the previous paragraph it is preferred that the operating temperature in the optional second polymerization reactor (R2) and in the optional third reactor (R3) is in the range from 62 to 95° C., more preferably in the range from 67 to 92° C.

Preferably, the operating temperature in the optional second polymerization reactor (R2) is equal to or higher than the operating temperature in the first polymerization reactor (R1).

Accordingly it is preferred that the operating temperature (a) in the first polymerization reactor (R1) is in the range from 62 to 85° C., more preferably in the range from 65 to 82° C., still more preferably in the range from 67 to 80° C., like 70 to 80° C.; and (b) in the optional second polymerization reactor (R2) is in the range from 75 to 95° C., more preferably in the range from 78 to 92° C., still more preferably in the range from 78 to 88° C., with the proviso that the operating temperature in the in the optional second polymerization reactor (R2) is equal or higher to the operating temperature in the first polymerization reactor (R1).

Typically the pressure in the first polymerization reactor (R1), preferably in the loop reactor (LR), is in the range from 20 to 80 bar, preferably 30 to 70 bar, like 35 to 65 bar, whereas the pressure in the optional second polymerization reactor (R2), i.e. in the (first) gas phase reactor (GPR1), and optionally in any subsequent reactor, like in the third polymerization reactor (R3), e.g. in the second gas phase reactor (GPR2), is in the range from 5 to 50 bar, preferably 15 to 40 bar.

Preferably hydrogen is added in each polymerization reactor in order to control the molecular weight, i.e. the melt flow rate $MFR_2$.

Preferably, the average residence time is rather long in the polymerization reactors (R1) and (R2). In general, the average residence time (τ) is defined as the ratio of the reaction volume ($V_R$) to the volumetric outflow rate from the reactor ($Q_o$) (i.e. $V_R/Q_o$), i.e i=$V_R/Q_o$ [tau=$V_R/Q_o$]. In case of a loop reactor the reaction volume ($V_R$) equals to the reactor volume.

Accordingly the average residence time (τ) in the first polymerization reactor (R1) is preferably at least 15 min, more preferably in the range from 15 to 80 min, still more preferably in the range from 20 to 60 min, like in the range from 24 to 50 min, and/or the average residence time (τ) in the second polymerization reactor (R2)—if present—is preferably at least 70 min, more preferably in the range from 70 to 220 min, still more preferably in the range from 80 to 210 min, yet more preferably in the range from 90 to 200 min, like in the range from 90 to 190 min. Preferably the average residence time (τ) in the third polymerization reactor (R3)—if present—is preferably at least 30 min, more preferably in the range from 30 to 120 min, still more preferably in the range from 40 to 100 min, like in the range from 50 to 90 min.

As mentioned above the preparation of the propylene polymer can comprise in addition to the (main) polymerization of the propylene homopolymer in the at least one polymerization reactor (R1 and optional R2 and R3) prior thereto a pre-polymerization in a pre-polymerization reactor (PR) upstream to the first polymerization reactor (R1).

In the pre-polymerization reactor (PR) a polypropylene (Pre-PP) is produced. The pre-polymerization is conducted in the presence of the Ziegler-Natta catalyst (ZN—C). According to this embodiment the Ziegler-Natta catalyst (ZN—C), the co-catalyst (Co), and the external donor (ED) are all introduced to the pre-polymerization step. However, this shall not exclude the option that at a later stage for instance further co-catalyst (Co) and/or external donor (ED) is added in the polymerization process, for instance in the first reactor (R1). In one embodiment the Ziegler-Natta catalyst (ZN—C), the co-catalyst (Co), and the external donor (ED) are only added in the pre-polymerization reactor (PR), if a pre-polymerization is applied.

The pre-polymerization reaction is typically conducted at a temperature of 0 to 60° C., preferably from 15 to 50° C., and more preferably from 20 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed is employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, preferably a mixture (MI) of the Ziegler-Natta catalyst (ZN—C) and the polypropylene (Pre-PP) produced in the pre-polymerization reactor (PR) is obtained. Preferably, the Ziegler-Natta catalyst (ZN—C) is (finely) dispersed in the polypropylene (Pre-PP). In other words, the Ziegler-Natta catalyst (ZN—C) particles introduced in the pre-polymerization reactor (PR) split into smaller fragments, which are evenly distributed within the growing polypropylene (Pre-PP). The sizes of the introduced Ziegler-Natta catalyst (ZN—C) particles as well as of the obtained fragments are not of essential relevance for the instant invention and within the skilled knowledge.

As mentioned above, if a pre-polymerization is used, subsequent to said pre-polymerization, the mixture (MI) of the Ziegler-Natta catalyst (ZN—C) and the polypropylene (Pre-PP) produced in the pre-polymerization reactor (PR) is transferred to the first reactor (R1). Typically the total amount of the polypropylene (Pre-PP) in the final propylene copolymer (R—PP) is rather low and typically not more than 5.0 wt.-%, more preferably not more than 4.0 wt.-%, still more preferably in the range from 0.5 to 4.0 wt.-%, like in the range 1.0 of to 3.0 wt.-%.

In case that pre-polymerization is not used, propylene and the other ingredients such as the Ziegler-Natta catalyst (ZN—C) are directly introduced into the first polymerization reactor (R1).

Accordingly, the propylene polymer may be produced in a process comprising the following steps under the conditions set out above (a) in the first polymerization reactor (R1), i.e. in a loop reactor (LR), propylene is polymerized obtaining a first fraction of the propylene polymer (PP1a),
(b) transferring said first fraction of the propylene polymer (PP1a) to a second polymerization reactor (R2),
(c) in the second polymerization reactor (R2) propylene is polymerized in the presence of the first fraction of the propylene polymer (PP1a) obtaining a second fraction of the propylene polymer (PP1b) of the propylene homopolymer, said first fraction of the propylene polymer (PP1a) and said second fraction of the propylene polymer (PP1b), form the propylene polymer.

Preferably, the propylene polymer is produced in a process comprising the following steps under the conditions set out above:

(a) in the first polymerization reactor (R1), i.e. in a loop reactor (LR), propylene is polymerized obtaining a first propylene polymer (PP1),
(b) removal of the first propylene polymer (PP1) from the first polymerization reactor.

A pre-polymerization as described above can be accomplished prior to step (a).

The catalyst used in the present invention is a solid Ziegler-Natta catalyst (ZN—C), which comprises compounds (TC) of a transition metal of Group 4 to 6 of IUPAC, like titanium, a Group 2 metal compound (MC), like a magnesium, and an internal donor (ID) being a non-phthalic compound, preferably a non-phthalic acid ester, still more preferably being a diester of non-phthalic dicarboxylic acids as described in more detail below. Thus, the catalyst is fully free of undesired phthalic compounds. Further, the solid catalyst is free of any external support material, like silica or $MgCl_2$, but the catalyst is self-supported. A self-supported catalyst is not free of magnesium halides, since these are formed during the reaction between the magnesium compound and $TiCl_4$; however, the presence of magnesium halides as external support media is excluded.

The Ziegler-Natta catalyst (ZN—C) can be further defined by the way as obtained. Accordingly, the Ziegler-Natta catalyst (ZN—C) is preferably obtained by a process comprising the steps of a)
  $a_1$) providing a solution of at least a Group 2 metal alkoxy compound (Ax) being the reaction product of a Group 2 metal compound (MC) and an alcohol (A) comprising in addition to the hydroxyl moiety at least one ether moiety optionally in an organic liquid reaction medium;

or $a_2$) a solution of at least a Group 2 metal alkoxy compound (Ax') being the reaction product of a Group 2 metal compound (MC) and an alcohol mixture of the alcohol (A) and a monohydric alcohol (B) of formula ROH, optionally in an organic liquid reaction medium;

or $a_3$) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium; and b) adding said solution from step a) to at least one compound (TC) of a transition metal of Group 4 to 6 and c) obtaining the solid catalyst component particles, and adding a non-phthalic internal electron donor (ID) at any step prior to step c).

The internal donor (ID) or precursor thereof is added preferably to the solution of step a).

According to the procedure above the Ziegler-Natta catalyst (ZN—C) can be obtained via precipitation method or via emulsion (liquid/liquid two-phase system)—solidification method depending on the physical conditions, especially temperature used in steps b) and c).

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range from 70 to 100° C., to secure full precipitation of the catalyst component in form of a solid particles (step c).

In emulsion—solidification method in step b) the solution of step a) is typically added to the at least one transition metal compound (TC) at a lower temperature, such as from −10 to below 50° C., preferably from −5 to 30° C. During agitation of the emulsion, the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion—solidification method is preferably used in the present invention.

In a preferred embodiment in step a) the solution of $a_2$) or $a_3$) are used, i.e. a solution of (Ax') or a solution of a mixture of (Ax) and (Bx).

Preferably, the Group 2 metal (MC) is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably, the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula $R''(OH)_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

Mg compound is typically provided as a 10 to 50 wt-% solution in a solvent as indicated above. Typical commercially available Mg compound, especially dialkyl magnesium solutions are 20-40 wt-% solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion—solidification method may be washed at least once, preferably at least twice, most preferably at least three times with a aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 $g/m^2$, more preferably below 10 $g/m^2$. Typically the amount of Ti is 1 to 6 wt-%, Mg 10 to 20 wt-% and donor 10 to 40 wt-% of the catalyst composition.

Detailed description of preparation of catalysts is disclosed in WO 2012/007430, EP2610271, EP 261027 and EP2610272, which are incorporated here by reference.

The Ziegler-Natta catalyst (ZN—C) is preferably used in association with an alkyl aluminum cocatalyst and optionally external donors.

As further component in the instant polymerization process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula $$R^a_pR^b_qSi(OR^c)_{(4-p-q)}$$

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, R and $R^c$ can be chosen independently from one another and can be the same or different. Specific examples of such silanes are (tert-butyl)$_2Si(OCH_3)_2$, (cyclohexyl)(methyl)$Si(OCH_3)_2$, (phenyl)$_2Si(OCH_3)_2$ and (cyclopentyl)$_2Si(OCH_3)_2$, or of general formula $$Si(OCH_2CH_3)_3(NR^3R^4)$$

wherein R3 and R4 can be the same or different a represent a hydrocarbon group having 1 to 12 carbon atoms.

R3 and R4 are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that R3 and R4 are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably, both $R^3$ and $R^4$ are the same, yet more preferably both $R^3$ and $R^4$ are an ethyl group.

Especially preferred external donors (ED) are the dicyclopentyl dimethoxy silane donor (D donor) or the cyclohexylmethyl dimethoxy silane donor (C-Donor).

In addition to the Ziegler-Natta catalyst (ZN—C) and the optional external donor (ED) a cocatalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Preferably, the ratio between the co-catalyst (Co) and the external donor (ED) [Co/ED] and/or the ratio between the co-catalyst (Co) and the transition metal TM [Co/TM] should be carefully chosen.

Accordingly, (a) the mol-ratio of co-catalyst (Co) to external donor (ED) [Co/ED] must be in the range from 5 to 45, preferably is in the range from 5 to 35, more preferably is in the range from 5 to 25;

and optionally (b) the mol-ratio of co-catalyst (Co) to titanium compound (TC) [Co/TC] must be in the range from above 80 to 500, preferably is in the range from 100 to 350, still more preferably is in the range from 120 to 300.

As outlined above, the first propylene polymer (PP1) can be nucleated, preferably α-nucleated. As nucleating agent, a polymeric nucleating agent, preferably a polymer of vinyl compound, more preferably a polymeric nucleating agent obtainable by polymerizing vinylcycloalkane monomers or vinylalkane monomers can be used.

The polymeric nucleating agent is more preferably a polymerized vinyl compound according to the following formula $$H_2C{=}CH{-}CHR^{11}R^{12}$$

wherein $R^{11}$ and $R^{12}$ together form a 5- or 6-membered saturated, unsaturated or aromatic ring, optionally containing substituents, or independently represent an alkyl group comprising 1 to 4 carbon atoms, whereby in case $R^{11}$ and $R^{12}$ form an aromatic ring, the hydrogen atom of the $-CHR^{11}R^{12}$ moiety is not present.

Even more preferably, the polymeric nucleating agent is selected from: vinyl cycloalkane polymer, preferably vinyl cyclohexane (VCH) polymer, vinyl cyclopentane polymer, 3-methyl-1-butene polymer and vinyl-2-methyl cyclohexane polymer.

The most preferred nucleating agent is vinyl cyclohexane (VCH) polymer.

As mentioned above, in a preferred embodiment, nucleating agent is a polymeric nucleating agent, more preferably a polymer of vinyl compound according to the formula as defined above, even more preferably vinyl cyclohexane (VCH) polymer.

The amount of nucleating agent preferably is not more than 10000 ppm by weight (means parts per million based on the total weight of the polypropylene composition (100 wt.-%), also abbreviated herein shortly as ppm), more preferably not more than 6000 ppm, even more preferably not more than 5000 ppm, based on the total weight of the first propylene polymer (PP1) (100 wt.-%).

The amount of the nucleating agent still more preferably is not more than 500 ppm, preferably is from 0.025 to 200 ppm, and more preferably is from 0.1 to 200 ppm, more preferably is from 0.3 to 200 ppm, most preferably is from 0.3 to 100 ppm, based on the total weight of the first propylene polymer (PP1) (100 wt.-%).

In the preferred embodiment the nucleating agent is a polymeric nucleating agent, most preferably a polymer of vinyl compound according to formula (III) as defined above, even more preferably vinyl cyclohexane (VCH) polymer as defined above, and the amount of said nucleating agent (B)

is not more than 200 ppm, more preferably is from 0.025 to 200 ppm, and more preferably is from 0.1 to 200 ppm, more preferably is from 0.3 to 200 ppm, most preferably is from 0.3 to 100 ppm, based on the total weight of the first propylene polymer (PP1) (100 wt.-%).

The nucleating agent may be introduced to the first propylene polymer (PP1) e.g. during the polymerization process of the first propylene polymer (PP1) or may be incorporated to the first propylene polymer (PP1) by mechanical blending with a nucleated polymer, containing the polymeric nucleating agent (so-called master batch technology) or by mechanical blending of the first propylene polymer (PP1) with the nucleating agent as such.

Thus, the nucleating agent can be introduced to the first propylene polymer (PP1) during the polymerization process of the first propylene polymer (PP1). The nucleating agent is preferably introduced to the first propylene polymer (PP1) by first polymerizing the above defined vinyl compound according to formula (II) as defined above, even more preferably vinyl cyclohexane (VCH), in the presence of a catalyst system as described above, comprising a solid Ziegler Natta catalyst component, a cocatalyst and optional external donor, and the obtained reaction mixture of the polymer of the vinyl compound according to formula (III) as defined above, even more preferably vinyl cyclohexane (VCH) polymer, and the catalyst system is then used for producing the first propylene polymer (PP1).

The polymerization of the vinyl compound, e. g. VCH, can be done in any inert fluid that does not dissolve the polymer formed (e. g. polyVCH). It is important to make sure that the viscosity of the final catalyst/polymerized vinyl compound/inert fluid mixture is sufficiently high to prevent the catalyst particles from settling during storage and transport.

The adjustment of the viscosity of the mixture can be done either before or after the polymerization of the vinyl compound. It is, e. g., possible to carry out the polymerization in a low viscosity oil and after the polymerization of the vinyl compound the viscosity can be adjusted by addition of a highly viscous substance. Such highly viscous substance can be a “wax”, such as an oil or a mixture of an oil with a solid or highly viscous substance (oil-grease). The viscosity of such a viscous substance is usually 1,000 to 15,000 cP at room temperature. The advantage of using wax is that the catalyst storing and feeding into the process is improved. Since no washing, drying, sieving and transferring are needed, the catalyst activity is maintained. The weight ratio between the oil and the solid or highly viscous polymer is preferably less than 5:1. In addition to viscous substances, liquid hydrocarbons, such as isobutane, propane, pentane and hexane, can also be used as a medium in the modification step.

The polypropylenes produced with a catalyst modified with polymerized vinyl compounds contain essentially no free (unreacted) vinyl compounds. This means that the vinyl compounds shall be completely reacted in the catalyst modification step. Further, the reaction time of the catalyst modification by polymerization of a vinyl compound should be sufficient to allow for complete reaction of the vinyl monomer, i. e. the polymerization is continued until the amount of unreacted vinyl compounds in the reaction mixture (including the polymerization medium and the reactants) is less than 0.5 wt %, in particular less than 2000 ppm by weight (shown by analysis). Thus, when the prepolymerized catalyst contains a maximum of about 0.1 wt % vinyl compound, the final vinyl compound content in the polypropylene will be below the limit of determination using the GC-MS method (<0.01 ppm by weight). Generally, when operating on an industrial scale, a polymerization time of at least 30 minutes is required, preferably the polymerization time is at least 1 hour and in particular at least 5 hours. Polymerization times even in the range from 6 to 50 hours can be used. The modification can be done at temperatures of 10 to 70° C., preferably 35 to 65° C.

This catalyst modification step is known as BNT-technology and is performed during the above-described pre-polymerization step in order to introduce the polymeric nucleating agent.

General preparation of such modified catalyst system vinyl compound (II) is disclosed e.g. in EP 1 028 984 or WO 00/6831.

In another embodiment, the polymeric nucleating agent is added with the so called masterbatch technology, where an already nucleated polymer, preferably a propylene homopolymer, containing the polymeric nucleating agent (masterbatch) is blended with the first propylene polymer (PP1). Such a masterbatch is preferably prepared by polymerizing propylene in a sequential polymerization process.

The produced propylene homopolymer, containing the polymeric nucleating agent, is the so-called carrier polymer. If the nucleating agent is added in the form of a masterbatch together with a carrier polymer, the concentration of the nucleating agent in the masterbatch is at least 10 ppm, typically at least 15 ppm. Preferably, this nucleating agent is present in the masterbatch in a range of from 10 to 2000 ppm, more preferably more than 15 to 1000 ppm, such as 20 to 500 ppm.

As described above, the carrier polymer is preferably a propylene homopolymer, produced with a catalyst system as described above for the first propylene polymer (PP1) and having an $MFR_2$ (230° C., 2.16 kg) in the range from 1.0 to 800 g/10 min, preferably 1.5 to 500 g/10 min, more preferably 2.0 to 200 g/10 min and most preferably 2.5 to 150 g/10 min.

More preferably, the carrier polymer is an isotactic propylene homopolymer having a melting point very similar to the above defined propylene homopolymer as the first propylene polymer (PP1). Therefore, the carrier polymer has a melting temperature $T_m$ measured by differential scanning 25 calorimetry (DSC) of equal or more than 150° C., i.e. of equal or more than 150 to 168° C., more preferably of at least 155° C., i.e. in the range from 155 to 166° C.

If the nucleating agent is added in the form of a masterbatch, the amount of masterbatch added is in the range from 1.0 to 10 wt %, preferably 1.5 to 8.5 wt % and more preferably 2.0 to 30 7.0 wt %, based on the total weight of the first propylene polymer (PP1).

The Spunbonded Layer (S) As outlined above, the nonwoven fabric (NF) according to the present invention comprises at least one spunbonded layer(s) (S), said spunbonded layer(s) (S) comprising spunbonded fibers (SBF).

Preferably, the spunbonded fibers (SBF) make up at least 80 wt.-% of the spunbonded layer(s) (S), more preferably at least 90 wt.-%, still more preferably at least 95 wt.-%. It is especially preferred that the spunbonded layer(s) (S) consist of the spunbonded fibers (SBF).

The spunbonded fibers (SBF) are obtained from a second propylene polymer (PP2).

The second propylene polymer (PP2) can be a propylene copolymer or a propylene homopolymer.

In case the second propylene polymer (PP2) is a propylene copolymer, the second propylene polymer (PP2) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably the second propylene polymer (PP2) according to this invention comprises, especially consists of, monomers copolymerizable with propylene from the group consisting of ethylene, 1-butene and 1-hexene. More specifically the second propylene polymer (PP2) of this invention comprises—apart from propylene—units derivable from ethylene and/or 1-butene. In a preferred embodiment, the second propylene polymer (PP2) comprises units derivable from ethylene and propylene only.

The comonomer content of the second propylene polymer (PP2) is in the range from 0.0 to 5.0 mol-%, yet more preferably in the range from 0.0 to 3.0 mol-%, still more preferably in the range from 0.0 to 1.0 mol-%.

In one embodiment, the second propylene polymer (PP2) is a second propylene homopolymer (H-PP2). Regarding the term "propylene homopolymer", reference is made to the definition provided above.

The second propylene polymer (PP2), like the second propylene homopolymer (H-PP2), is preferably featured by a moderate melt flow rate. Accordingly, the second propylene polymer (PP2), like the second propylene homopolymer (H-PP2), has a melt flow rate $MFR_2$ (final) (230° C./2.16 kg) measured according to ISO 1133 in the range from 5.0 to 50 g/10 min, more preferably in the range from 10 to 45 g/10 min, still more preferably in the range from 15 to 40 g/10 min, yet more preferably in the range from 20 to 35 g/10 min, like in the range from 25 to 32 g/10 min.

Unless otherwise indicated, throughout the instant invention the melt flow rate (230° C./2.16 kg) of the second propylene polymer (PP2), like the second propylene homopolymer (H-PP2), is preferably the melt flow rate (230° C./2.16 kg) after visbreaking (if visbreaking has been applied).

Thus, it is preferred that the second propylene polymer (PP2), like the second propylene homopolymer (H-PP2), has been visbroken.

Accordingly, the melt flow rate $MFR_2$ (initial) (230° C./2.16 kg), i.e. the melt flow rate before visbreaking, of the second propylene polymer (PP2), like the second propylene homopolymer (H-PP2), is much lower, like from 0.1 to 5 g/10 min. For example, the melt flow rate $MFR_2$ (initial) (230° C./2.16 kg) of the second propylene polymer (PP2), like the second propylene homopolymer (H-PP2), before visbreaking is from 1 to 4 g/10 min, like from 2 to 3.5 g/10 min.

In one embodiment of the present invention, the second propylene polymer (PP2), like the second propylene homopolymer (H-PP2), has been visbroken wherein the second propylene polymer (PP2), like the second propylene homopolymer (H-PP2), fulfils inequation (III):

$$5.0 < \frac{MFR(\text{final})}{MFR(\text{initial})} < 20.0 \quad \text{(III)}$$

wherein MFR(final) is the melt flow rate $MFR_2$ (230° C.) determined according to ISO 1133 after visbreaking and MFR(initial) is the melt flow rate MFR2 (230° C.) determined according to ISO 1133 before visbreaking.

More preferably, the second propylene polymer (PP2), like the second propylene homopolymer (H-PP2), fulfils inequation (Ia):

$$7.0 < \frac{MFR(\text{final})}{MFR(\text{initial})} < 18.0 \quad \text{(IIIa)}$$

Still more preferably, the second propylene polymer (PP2), like the second propylene homopolymer (H-PP2), fulfils inequation (Ib):

$$9.0 < \frac{MFR(\text{final})}{MFR(\text{initial})} < 16.0 \quad \text{(IIIb)}$$

Most preferably, the second propylene polymer (PP2), like the second propylene homopolymer (H-PP2), fulfils inequation (Ic):

$$10.0 < \frac{MFR(\text{final})}{MFR(\text{initial})} < 14.0 \quad \text{(IIIc)}$$

It is further preferred that the second propylene polymer (PP2), like the second propylene homopolymer (H-PP2), fulfils inequation (IV):

$$1.05 < \frac{MWD(\text{initial})}{MWD(\text{final})} < 1.50, \quad \text{(IVI)}$$

wherein MWD(final) is the molecular weight distribution (Mw/Mn), determined by Gel Permeation Chromatography, after visbreaking and MWD(initial) is the molecular weight distribution (Mw/Mn), determined by Gel Permeation Chromatography, before visbreaking.

More preferably, the second propylene polymer (PP2), like the second propylene homopolymer (H-PP2), fulfils inequation (IVa):

$$1.08 < \frac{MWD(\text{initial})}{MWD(\text{final})} < 1.40 \quad \text{(IVa)}$$

Still more preferably, the second propylene polymer (PP2), like the second propylene homopolymer (H-PP2), fulfils inequation (IVb):

$$1.10 < \frac{MWD(\text{initial})}{MWD(\text{final})} < 1.30 \quad \text{(IVb)}$$

Most preferably, the second propylene polymer (PP2), like the second propylene homopolymer (H-PP2), fulfils inequation (IVc):

$$1.12 < \frac{MWD(\text{initial})}{MWD(\text{final})} < 1.25 \quad \text{(IVc)}$$

Regarding the visbreaking conditions and visbreaking agents for the of the second propylene polymer (PP2), like the second propylene homopolymer (H-PP2), reference is made to the definitions provided above with regard to the first propylene polymer (PP1).

Preferably, the second propylene polymer (PP2), like the second propylene homopolymer (H-PP2), is isotactic. However, it is preferred that the second propylene polymer (PP2), like the second propylene homopolymer (H-PP2), has a pentad concentration (mmmm %), in the range from 95.00 to 99.99%, more preferably in the range from 97.00 to 99.97%, still more preferably in the range from 98.50 to 99.90%.

A further characteristic of the second propylene polymer (PP2), like the second propylene homopolymer (H-PP2), is the presence of misinsertions of propylene within the polymer chain, which indicates that the second propylene polymer (PP2), like the second propylene homopolymer (H-PP2), is produced in the presence of a single site catalyst, preferably in the presence of a single site catalyst (SSC) as defined in more detail below. Accordingly, the second propylene polymer (PP2), like the second propylene homopolymer (H-PP2), is preferably featured by an amount of 2,1 erythro regio-defects in the range from 0.40 to 1.50 mol-%, more preferably in the range from 0.45 to 1.50 mol-%, still more preferably in the range from 0.45 to 1.40 mol-%, yet more preferably in the range from 0.50 to 1.00 mol-%, most preferably in the range from 0.50 to 0.85 mol-%, as determined by $^{13}$C-NMR spectroscopy.

It is preferred that the second propylene polymer (PP2), like the second propylene homopolymer (H-PP2), is featured by rather low cold xylene soluble (XCS) content, i.e. by a xylene cold soluble (XCS) in the range from 0.1 to 2.0 wt.-%. Accordingly, the second propylene polymer (PP2), like the second propylene homopolymer (H-PP2), has preferably a xylene cold soluble content (XCS) in the range from more than 0.3 to 1.5 wt.-%, more preferably in the range from 0.4 to 1.2 wt.-%, still more preferably in the range from 0.5 to 1.0 wt.-%.

The amount of xylene cold solubles (XCS) additionally indicates that the second propylene polymer (PP2), like the second propylene homopolymer (H-PP2), is preferably free of any elastomeric polymer component, like an ethylene propylene rubber. In other words, the second propylene polymer (PP2), like the second propylene homopolymer (H-PP2), shall be not a heterophasic polypropylene, i.e. a system consisting of a polypropylene matrix in which an elastomeric phase is dispersed. Such systems are featured by a rather high xylene cold soluble content.

The amount of xylene cold solubles (XCS) additionally indicates that the second propylene polymer (PP2), like the second propylene homopolymer (H-PP2), preferably does not contain elastomeric (co)polymers forming inclusions as a second phase for improving mechanical properties. A polymer containing elastomeric (co)polymers as insertions of a second phase would by contrast be called heterophasic and is preferably not part of the present invention. The presence of second phases or the so-called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly, it is preferred that the second propylene polymer (PP2), like the second propylene homopolymer (H-PP2), according to this invention has no glass transition temperature below −30, preferably below −25° C., more preferably below −20° C.

On the other hand, in one preferred embodiment the second propylene polymer (PP2), like the second propylene homopolymer (H-PP2), according to this invention has a glass transition temperature in the range from −12 to 5° C., more preferably in the range from −10 to 4° C.

Further, the second propylene polymer (PP2), like the second propylene homopolymer (H-PP2), is featured by a rather low weight molecular weight. Accordingly, it is preferred that the second propylene polymer (PP2), like the second propylene homopolymer (H-PP2), has a weight molecular weight Mw (initial) before visbreaking below 500 kg/mol, more preferably in the range from 100 to 400 kg/mol, still more preferably in the range from 250 kg/mol to 350 kg/mol.

Additionally or alternatively to the previous paragraph, it is preferred that the second propylene polymer (PP2), like the second propylene homopolymer (H-PP2), has an initial molecular weight distribution (Mw(initial)/Mn(initial)) before visbreaking in the range from 2.0 to 5.0, more preferably in the range from 2.3 to 4.0, still more preferably in the range from 2.5 to 3.5.

As outlined above, it is preferred that the second propylene polymer (PP2), like the second propylene homopolymer (H-PP2), has been visbroken.

Accordingly, it is preferred that the second propylene polymer (PP2), like the second propylene homopolymer (H-PP2), has a final molecular weight distribution (Mw (final)/Mn(final)) after visbreaking in the range from 2.0 to 4.5, in the range from 2.1 to 3.5, still more preferably in the range from 2.2 to 3.0.

The second propylene polymer (PP2), like the second propylene homopolymer (H-PP2), has a rather low melting temperature. Therefore, the second propylene polymer (PP2), like the second propylene homopolymer (H-PP2), has a melting temperature $T_m$ measured by differential scanning calorimetry (DSC) in the range from 145 to 160° C., i.e. in the range from 148° C. to 157° C., more preferably in the range from 149° C. to 155° C.

Further it is preferred that the second propylene polymer (PP2), like the second propylene homopolymer (H-PP2), has a crystallization temperature Tc measured by differential scanning calorimetry (DSC) of equal or more than 100° C., more preferably in the range from 105 to 115° C., more preferably in the range from 107 to 113° C.

The second propylene polymer (PP2), like the second propylene homopolymer (H-PP2), is preferably featured by a lower stiffness. Accordingly, the second propylene polymer (PP2), like the second propylene homopolymer (H-PP2), preferably has a lower tensile modulus. Accordingly it is preferred that the second propylene polymer (PP2), like the second propylene homopolymer (H-PP2), has a tensile modulus measured at 23° C. according to ISO 527-1 (cross head speed 1 mm/min) of below 1,600 MPa, more preferably in the range from 1,000 to 1,500 MPa, still more preferably in the range from 1,100 to 1,400 MPa.

Preferably, the second propylene polymer (PP2), like the second propylene homopolymer (H-PP2), is obtained by polymerizing propylene in the presence of a single site catalyst (SSC) as defined below. More preferably, the second propylene polymer (PP2), like the second propylene homopolymer (H-PP2), according to this invention is obtained by a process as defined in detail below by using the single site catalyst (SSC).

The second propylene polymer (PP2), like the second propylene homopolymer (H-PP2), may comprise, more preferably may consist of, two fractions, namely a first fraction of the second propylene polymer (PP2a) and a second fraction of the second propylene polymer (PP2b). Preferably the weight ratio between the first fraction of the second propylene polymer (PP2a) and the second fraction of the second propylene polymer (PP2b) [(PP2a):(PP2b)] is 70:30 to 40:60, more preferably 65:35 to 45:55.

The first fraction of the second propylene polymer (PP2a) and the second fraction of the second propylene polymer (PP2b) may differ in the melt flow rate. However, it is preferred that the melt flow rate $MFR_2$ (230° C.) of the first fraction of the second propylene polymer (PP2a) and of the second fraction of the second propylene polymer (PP2b) are nearly identical, i.e. differ not more than 15% as calculated from the lower of the two values, preferably differ not more than 10%, like differ not more than 7%.

The second propylene polymer (PP2), like the second propylene homopolymer (H-PP2), of the present invention may comprise further components. However, it is preferred that the inventive second propylene polymer (PP2), like the second propylene homopolymer (H-PP2), comprises as polymer components only the second propylene polymer (PP2), like the second propylene homopolymer (H-PP2), as defined in the instant invention. Accordingly, the amount of second propylene polymer (PP2), like the second propylene homopolymer (H-PP2), may not result in 100.0 wt.-% based on the total second propylene polymer (PP2), like the second propylene homopolymer (H-PP2). Thus, the remaining part up to 100.0 wt.-% may be accomplished by further additives known in the art. However, this remaining part shall be not more than 5.0 wt.-%, like not more than 3.0 wt.-% within the total second propylene polymer (PP2), like the second propylene homopolymer (H-PP2). For instance, the inventive second propylene polymer (PP2), like the second propylene homopolymer (H-PP2), may comprise additionally small amounts of additives selected from the group consisting of antioxidants, stabilizers, fillers, colorants, nucleating agents and antistatic agents. In general, they are incorporated during granulation of the pulverulent product obtained in the polymerization. Accordingly, the second propylene polymer (PP2), like the second propylene homopolymer (H-PP2), constitutes at least to 95.0 wt.-%, more preferably at least 97.0 wt.-% to the total second propylene polymer (PP2), like the second propylene homopolymer (H-PP2).

In case the second propylene polymer (PP2), like the second propylene homopolymer (H-PP2), comprises a α-nucleating agent, it is preferred that it is free of β-nucleating agents. The α-nucleating agent is preferably selected from the group consisting of (i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate], and
(iv) vinylcycloalkane polymer and vinylalkane polymer (as discussed in more detail below), and
(v) mixtures thereof.

Such additives are generally commercially available and are described, for example, in "Plastic Additives Handbook", pages 871 to 873, 5th edition, 2001 of Hans Zweifel.

Preferably, the propylene homopolymer contains up to 5.0 wt.-% of the α-nucleating agent. In a preferred embodiment, the propylene homopolymer contains not more than 500 ppm, more preferably of 0.025 to 200 ppm, more preferably of 0.1 to 200 ppm, still more preferably 0.3 to 200 ppm, most preferably 0.3 to 100 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, sodium 2,2'-methylenebis (4,6,-di-tert-butylphenyl) phosphate, vinylcycloalkane polymer, vinylalkane polymer, and mixtures thereof.

As outlined above, the spunbonded layer (S) according to the present invention comprises spunbonded fibers (SBF) obtained from the second propylene polymer (PP2). The spunbonded fibers (SBF) preferably comprise at least 95 wt.-%, based on the total weight of the melt blown fibers, of the second propylene polymer (PP2), like the second propylene homopolymer (H-PP2), as described above. It is especially preferred that the spunbonded fibers (SBF) consist of the second propylene polymer (PP2), like the second propylene homopolymer (H-PP2).

More preferably, the spunbonded layer (S) according to the present invention comprises a spunbonded web (SBW) made of the spunbonded fibers (SBF) as described above. It is preferred that the total grammage of the one or more spunbonded layers (S), determined according to ISO 536:1995, is in the range from 5.0 to 100 $g/m^2$, more preferably in the range from 8.0 to 50 $g/m^2$, most preferably in the range from 10.0 to 20 $g/m^2$.

It is further preferred that each instance of the spunbonded layer (S), more preferably each spunbonded web (SBW), has a grammage determined according to ISO 536:1995 in the range from 2.0 to 30 $g/m^2$, 2.5 to 15 $g/m^2$, 3.0 to 6.0 $g/m^2$.

The second propylene polymer (PP2), like the second propylene homopolymer (H-PP2), according to this invention is preferably produced in the presence of a single site catalyst, more preferably in the presence of a single site catalyst (SSC) as described below.

Preferably, the second propylene polymer (PP2), like the second propylene homopolymer (H-PP2), is produced in a sequential polymerization process as further described below comprising at least two reactors (R1) and (R2), in the first reactor (R1) the first fraction of the second propylene polymer (PP2a) is produced and subsequently transferred into the second reactor (R2), in the second reactor (R2) the second fraction of the second propylene polymer (PP2b) is produced in the presence of the first fraction of the second propylene polymer (PP2a).

Process for the Polymerization of PP2 The process for the preparation of the propylene polymer as well as the single site catalyst (SSC) are further described in detail below.

As already indicated above, the second propylene polymer (PP2), like the second propylene homopolymer (H-PP2), is preferably produced in a sequential polymerization process.

The term "sequential polymerization system" indicates that the second propylene polymer (PP2), like the second propylene homopolymer (H-PP2), is produced in at least two reactors connected in series. Accordingly, the present polymerization system comprises at least a first polymerization reactor (R1) and a second polymerization reactor (R2), and optionally a third polymerization reactor (R3). The term "polymerization reactor" shall indicate that the main polymerization takes place. Thus, in case the process consists of two polymerization reactors, this definition does not exclude the option that the overall system comprises for instance a pre-polymerization step in a pre-polymerization reactor. The term "consist of" is only a closing formulation in view of the main polymerization reactors.

Preferably, at least one of the two polymerization reactors (R1) and (R2) is a gas phase reactor (GPR). Still more preferably the second polymerization reactor (R2) and the optional third polymerization reactor (R3) are gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

Accordingly, the first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention, the slurry reactor (SR) is preferably a (bulk) loop reactor (LR). Accordingly the average concentration of the first fraction ($1^{st}$ F) of the second propylene polymer (PP2), like the second propylene homopolymer (H-PP2), (i.e. the first fraction of the second propylene polymer (PP2a)), in the polymer slurry within the loop reactor (LR) is typically from 15 wt.-% to 55 wt.-%, based on the total weight of the polymer slurry within the loop reactor (LR). In one preferred embodiment of the present invention the average concentration of the first fraction of the second propylene polymer (PP2a) in the polymer slurry within the loop reactor (LR) is from 20 wt.-% to 55 wt.-% and more preferably from 25 wt.-% to 52 wt.-%, based on the total weight of the polymer slurry within the loop reactor (LR).

Preferably the propylene homopolymer of the first polymerization reactor (R1), i.e. the first fraction of the second propylene polymer (PP2a), more preferably the polymer slurry of the loop reactor (LR) containing the first fraction of the second propylene polymer (PP2a), is directly fed into the second polymerization reactor (R2), i.e. into the (first) gas phase reactor (GPR1), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR), the polymer slurry comprising the first fraction of the second propylene polymer (PP2a), is led directly to the next stage gas phase reactor.

Alternatively, the propylene homopolymer of the first polymerization reactor (R1), i.e. the first fraction of the second propylene polymer (PP2a), more preferably polymer slurry of the loop reactor (LR) containing the first fraction of the second propylene polymer (PP2a), may be also directed into a flash step or through a further concentration step before fed into the second polymerization reactor (R2), i.e. into the gas phase reactor (GPR). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

More specifically, the second polymerization reactor (R2), and any subsequent reactor, for instance the third polymerization reactor (R3), are preferably gas phase reactors (GPRs). Such gas phase reactors (GPR) can be any mechanically mixed or fluid bed reactors. Preferably, the gas phase reactors (GPRs) comprise a mechanically agitated fluid bed reactor with gas velocities of at least 0.2 m/sec. Thus, it is appreciated that the gas phase reactor is a fluidized bed type reactor preferably with a mechanical stirrer.

Thus, in a preferred embodiment the first polymerization reactor (R1) is a slurry reactor (SR), like loop reactor (LR), whereas the second polymerization reactor (R2) and any optional subsequent reactor, like the third polymerization reactor (R3), are gas phase reactors (GPRs). Accordingly for the instant process at least two, preferably two polymerization reactors (R1) and (R2) or three polymerization reactors (R1), (R2) and (R3), namely a slurry reactor (SR), like loop reactor (LR) and a (first) gas phase reactor (GPR1) and optionally a second gas phase reactor (GPR2), connected in series are used. If needed prior to the slurry reactor (SR) a pre-polymerization reactor is placed.

The single site catalyst (SSC) is fed into the first polymerization reactor (R1) and is transferred with the polymer (slurry) obtained in the first polymerization reactor (R1) into the subsequent reactors. If the process covers also a pre-polymerization step, it is preferred that all of the single site catalyst (SSC) is fed in the pre-polymerization reactor. Subsequently the pre-polymerization product containing the single site catalyst (SSC) is transferred into the first polymerization reactor (R1).

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Especially good results are achieved in case the temperature in the reactors is carefully chosen.

Accordingly it is preferred that the operating temperature in the first polymerization reactor (R1) is in the range from 62 to 85° C., more preferably in the range from 65 to 82° C., still more preferably in the range from 67 to 80° C.

Alternatively or additionally to the previous paragraph it is preferred that the operating temperature in the second polymerization reactor (R2) and optional in the third reactor (R3) is in the range from 75 to 95° C., more preferably in the range from 78 to 92° C.

Preferably, the operating temperature in the second polymerization reactor (R2) is equal to or higher than the operating temperature in the first polymerization reactor (R1). Accordingly it is preferred that the operating temperature (a) in the first polymerization reactor (R1) is in the range from 62 to 85° C., more preferably in the range from 65 to 82° C., still more preferably in the range from 67 to 80° C., like 70 to 80° C.; and (b) in the second polymerization reactor (R2) is in the range from 62 to 95° C., more preferably in the range from 65 to 92° C., still more preferably in the range from 67 to 88° C., with the proviso that the operating temperature in the in the second polymerization reactor (R2) is equal or higher to the operating temperature in the first polymerization reactor (R1).

Typically the pressure in the first polymerization reactor (R1), preferably in the loop reactor (LR), is in the range from 20 to 80 bar, preferably 30 to 70 bar, like 35 to 65 bar, whereas the pressure in the second polymerization reactor (R2), i.e. in the (first) gas phase reactor (GPR1), and optionally in any subsequent reactor, like in the third polymerization reactor (R3), e.g. in the second gas phase reactor (GPR2), is in the range from 5 to 50 bar, preferably 15 to 40 bar.

Preferably hydrogen is added in each polymerization reactor in order to control the molecular weight, i.e. the melt flow rate $MFR_2$.

Preferably, the average residence time is rather long in the polymerization reactors (R1) and (R2). In general, the average residence time ($\tau$) is defined as the ratio of the reaction volume ($V_R$) to the volumetric outflow rate from the reactor ($Q_o$) (i.e. $V_R/Q_o$), i.e $\tau=V_R/Q_o$ [tau=$V_R/Q_o$]. In case of a loop reactor the reaction volume ($V_R$) equals to the reactor volume.

Accordingly the average residence time ($\tau$) in the first polymerization reactor (R1) is preferably at least 15 min, more preferably in the range from 15 to 80 min, still more preferably in the range from 20 to 60 min, like in the range from 24 to 50 min, and/or the average residence time ($\tau$) in the second polymerization reactor (R2) is preferably at least 70 min, more preferably in the range from 70 to 220 min, still more preferably in the range from 80 to 210 min, yet more preferably in the range from 90 to 200 min, like in the range from 90 to 190 min. Preferably the average residence time ($\tau$) in the third polymerization reactor (R3)—if present—is preferably at least 30 min, more preferably in the range from 30 to 120 min, still more preferably in the range from 40 to 100 min, like in the range from 50 to 90 min.

As mentioned above the preparation of the propylene homopolymer can comprise in addition to the (main) polymerization of the propylene homopolymer in the at least two polymerization reactors (R1, $R^3$ and optional $R^3$) prior thereto a pre-polymerization in a pre-polymerization reactor (PR) upstream to the first polymerization reactor (R1).

In the pre-polymerization reactor (PR) a polypropylene (Pre-PP) is produced. The pre-polymerization is conducted in the presence of the single site catalyst (SSC). According to this embodiment, the single site catalyst is introduced to the pre-polymerization step. However, this shall not exclude the option that at a later stage for instance further co-catalyst is added in the polymerization process, for instance in the first reactor (R1). In one embodiment, all components of the single site catalyst are only added in the pre-polymerization reactor (PR), if a pre-polymerization is applied.

The pre-polymerization reaction is typically conducted at a temperature of 0 to 60° C., preferably from 15 to 50° C., and more preferably from 20 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed is employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, preferably a mixture (MI) of the single site catalyst (SSC) and the polypropylene (Pre-PP) produced in the pre-polymerization reactor (PR) is obtained. Preferably, the single site catalyst (SSC) is (finely) dispersed in the polypropylene (Pre-PP). In other words, the single site catalyst (SSC) particles introduced in the pre-polymerization reactor (PR) are split into smaller fragments that are evenly distributed within the growing polypropylene (Pre-PP). The sizes of the introduced single site catalyst (SSC) particles as well as of the obtained fragments are not of essential relevance for the instant invention and within the skilled knowledge.

As mentioned above, if a pre-polymerization is used, subsequent to said pre-polymerization, the mixture (MI) of the single site catalyst (SSC) and the polypropylene (Pre-PP) produced in the pre-polymerization reactor (PR) is transferred to the first reactor (R1). Typically the total amount of the polypropylene (Pre-PP) in the final propylene copolymer (R—PP) is rather low and typically not more than 5.0 wt.-%, more preferably not more than 4.0 wt.-%, still more preferably in the range from 0.5 to 4.0 wt.-%, like in the range 1.0 of to 3.0 wt.-%.

In case that pre-polymerization is not used, propylene and the other ingredients such as the single site catalyst (SSC) are directly introduced into the first polymerization reactor (R1). Accordingly, the propylene homopolymer is preferably produced in a process comprising the following steps under the conditions set out above (a) in the first polymerization reactor (R1), i.e. in a loop reactor (LR), propylene is polymerized obtaining a first fraction of the second propylene polymer (PP2a), (b) transferring said first fraction of the second propylene polymer (PP2a) to a second polymerization reactor (R2), (c) in the second polymerization reactor (R2) propylene is polymerized in the presence of the first fraction of the second propylene polymer (PP2a) obtaining a second fraction of the second propylene polymer (PP2b), said first fraction of the second propylene polymer (PP2a) and said second first fraction of the second propylene polymer (PP2b) form the second propylene polymer (PP2).

A pre-polymerization as described above can be accomplished prior to step (a).

As pointed out above, in the specific process for the preparation of the propylene homopolymer as defined above a single site catalyst (SSC) should be used. Accordingly, the single site catalyst (SSC) will be now described in more detail.

The single site catalyst according to the present invention may be any supported metallocene catalyst suitable for the production of highly isotactic polypropylene.

It is preferred that the single site catalyst (SSC) comprises a metallocene complex, a co-catalyst system comprising a boron-containing co-catalyst and/or aluminoxane co-catalyst, and a silica support.

In particular, it is preferred that the single site catalyst (SSC) comprises (i) a metallocene complex of the general formula (V)

Formula (V)

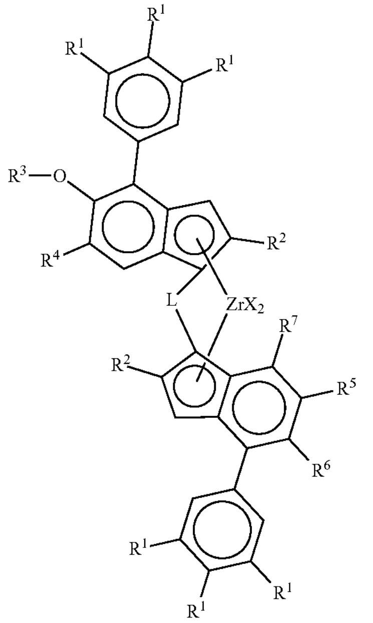

wherein each X independently is a sigma-donor ligand,

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom or a $C_1$-$C_{20}$-hydrocarbyl 5 group optionally containing one or more heteroatoms from groups 14-16 of the periodic table or fluorine atoms, or optionally two R' groups taken together can form a ring, each $R^1$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group, and optionally two adjacent $R^1$ groups can be part of a ring including the phenyl carbons to which they are bonded, each $R^2$ independently are the same or can be different and are a $CH_2$—$R^8$ group, with $R^8$ being H or linear or branched $C_{1-6}$-alkyl group, $C_{3-8}$-cycloalkyl group, $C_{6-10}$-aryl group, $R^3$ is a linear or branched $C_1$-$C_6$-alkyl group, $C_{7-20}$-arylalkyl, $C_{7-20}$-alkylaryl group or $C_6$-$C_{20}$-aryl group, $R^4$ is a $C(R^9)_3$ group, with $R^9$ being a linear or branched $C_1$-$C_6$-alkyl group, $R^5$ is hydrogen or an aliphatic $C_1$-$C_{20}$-hydrocarbyl group optionally containing one or more heteroatoms from groups 14-16 of the periodic table;

$R^6$ is hydrogen or an aliphatic $C_1$-$C_{20}$-hydrocarbyl group optionally containing one or more heteroatoms from groups 14-16 of the periodic table; or $R^5$ and $R^6$ can be taken together to form a 5 membered saturated carbon ring which is optionally substituted by n groups $R^{10}$, n being from 0 to 4;

each $R^{10}$ is same or different and may be a $C_1$-$C_{20}$-hydrocarbyl group, or a $C_1$-$C_{20}$-hydrocarbyl group optionally containing one or more heteroatoms belonging to groups 14-16 of the periodic table;

$R^7$ is H or a linear or branched $C_1$-$C_6$-alkyl group or an aryl or heteroaryl group having 6 to 20 carbon atoms optionally substituted by one to three groups $R^{11}$, each $R^{11}$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group, (ii) a co-catalyst system comprising a boron containing co-catalyst and/or an aluminoxane co-catalyst, and (iii) a silica support.

The term "sigma-donor ligand" is well understood by the person skilled in the art, i.e. a group bound to the metal via a sigma bond. Thus the anionic ligands "X" can independently be halogen or be selected from the group consisting of R', OR', SiR'$_3$, OSiR'$_3$, $OSO_2CF_3$, OCOR', SR', NR'$_2$ or PR'$_2$ group wherein R' is independently hydrogen, a linear or branched, cyclic or acyclic, $C_1$ to $C_{20}$ alkyl, $C_2$ to $C_{20}$ alkenyl, $C_2$ to $C_{20}$ alkynyl, $C_3$ to $C_{12}$ cycloalkyl, $C_6$ to $C_{20}$ aryl, $C_7$ to $C_{20}$ arylalkyl, $C_7$ to $C_{20}$ alkylaryl, $C_8$ to $C_{20}$ arylalkenyl, in which the R' group can optionally contain one or more heteroatoms belonging to groups 14 to 16. In a preferred embodiment the anionic ligands "X" are identical and either halogen, like Cl, or methyl or benzyl.

A preferred monovalent anionic ligand is halogen, in particular chlorine (Cl).

More preferably, the metallocene catalyst has the formula (Va)

(Va)

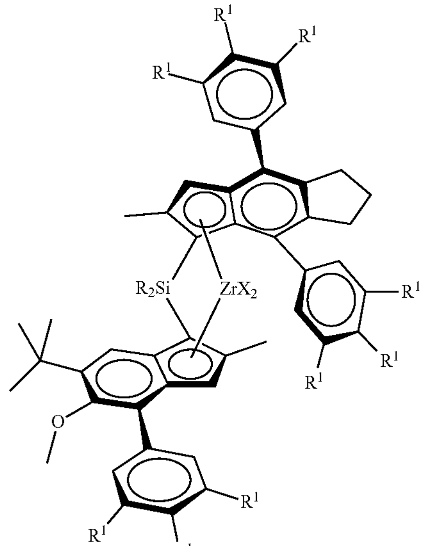

wherein each $R^1$ are independently the same or can be different and are hydrogen or a linear or branched $C_1$-$C_6$ alkyl group, whereby at least on $R^1$ per phenyl group is not hydrogen, R' is a $C_1$-$C_{10}$ hydrocarbyl group, preferably a $C_1$-$C_4$ hydrocarbyl group and more preferably a methyl group and X independently is a hydrogen atom, a halogen atom, $C_1$-$C_6$ alkoxy group, $C_1$-$C_6$ alkyl group, phenyl or benzyl group.

Most preferably, X is chlorine, benzyl or a methyl group. Preferably, both X groups are the same. The most preferred options are two chlorides, two methyl or two benzyl groups, especially two chlorides.

Preferred complexes of the metallocene catalyst include:

rac-dimethylsilanediylbis[2-methyl-4-(3',5'-dimethylphenyl)-5-methoxy-6-tert-butylinden-1-yl]zirconium dichloride, rac-anti-dimethylsilanediyl[2-methyl-4-(4'-tert-butylphenyl)-inden-1-yl][2-methyl-4-(4'-tertbutylphenyl)-5-methoxy-6-tert-butylinden-1-yl]zirconium dichloride, rac-anti-dimethylsilanediyl[2-methyl-4-(4'-tert-butylphenyl)-inden-1-yl][2-methyl-4-phenyl-5-methoxy-6-tert-butylinden-1-yl]zirconium dichloride, rac-anti-dimethylsilanediyl[2-methyl-4-(3',5'-tert-butylphenyl)-1,5,6,7-tetrahydro-sindacen-1-yl][2-methyl-4-(3',5'-dimethyl-phenyl)-5-methoxy-6-tert-butylinden-1-yl]zirconium dichloride, rac-anti-dimethylsilanediyl[2-methyl-4,8-bis-(4'-tert-butylphenyl)-1,5,6,7-tetrahydro-sindacen-1-yl][2-methyl-4-(3',5'-dimethyl-phenyl)-5-methoxy-6-tert-butylinden-1-yl]zirconium dichloride, rac-anti-dimethylsilanediyl[2-methyl-4,8-bis-(3',5'-dimethylphenyl)-1,5,6,7-tetrahydro-s-indacen-1-yl][2-methyl-4-(3',5'-dimethylphenyl)-5-methoxy-6-tert-butylinden-1-yl] zirconium dichloride, rac-anti-dimethylsilanediyl[2-methyl-4,8-bis-(3',5'-dimethylphenyl)-1,5,6,7-tetrahydro-s-indacen-1-yl][2-methyl-4-(3',5'-5 ditert-butyl-phenyl)-5-methoxy-6-tert-butylinden-1-yl]zirconium dichloride.

Especially preferred is rac-anti-dimethylsilanediyl[2-methyl-4,8-bis-(3',5'-dimethylphenyl)-1,5,6,7-tetrahydro-s indacen-1-yl][2-methyl-4-(3',5'-dimethylphenyl)-5-methoxy-6-tertbutylinden-1-yl]zirconium dichloride (Vb)

(Vb)

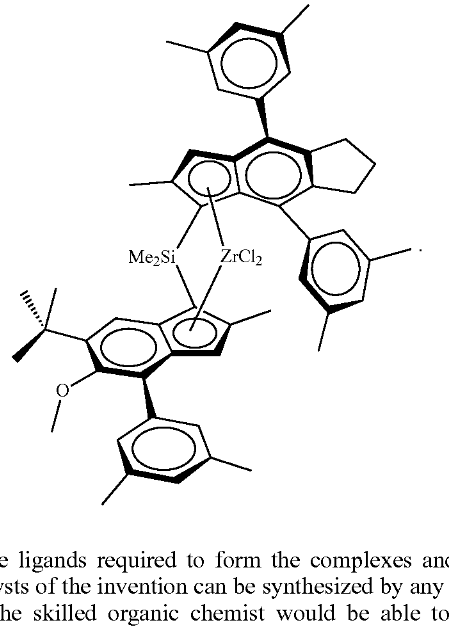

The ligands required to form the complexes and hence catalysts of the invention can be synthesized by any process and the skilled organic chemist would be able to devise various synthetic protocols for the manufacture of the necessary ligand materials. For Example WO2007/116034 discloses the necessary chemistry. Synthetic protocols can also generally be found in WO 2002/02576, WO 2011/135004, WO 2012/084961, WO 2012/001052, WO 2011/076780, WO 2015/158790 and WO 2018/122134. Especially reference is made to WO 2019/179959, in which the most preferred catalyst of the present invention is described.

According to the present invention a co-catalyst system comprising a boron containing co-catalyst and/or an aluminoxane co-catalyst is used in combination with the above defined metallocene catalyst complex.

The aluminoxane co-catalyst can be one of formula (VI):

(VI)

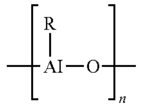

where n is usually from 6 to 20 and R has the meaning below.

Aluminoxanes are formed on partial hydrolysis of organoaluminum compounds, for example those of the formula $AlR_3$, $AlR_2Y$ and $Al_2R^3Y_3$ where R can be, for example, $C_1$-$C_{10}$ alkyl, preferably $C_1$-$C_5$ alkyl, or $C_3$-$C_{10}$ cycloalkyl, $C_7$-$C_{12}$ arylalkyl or alkylaryl and/or phenyl or naphthyl, and where Y can be hydrogen, halogen, preferably chlorine or bromine, or $C_1$-$C_{10}$ alkoxy, preferably methoxy or ethoxy. The resulting oxygen-containing aluminoxanes are not in general pure compounds but mixtures of oligomers of the formula (VI).

The preferred aluminoxane is methylaluminoxane (MAO). Since the aluminoxanes used as co-catalysts according to the invention are not, owing to their mode of preparation, pure compounds, the molarity of aluminoxane solutions hereinafter is based on their aluminium content.

According to the present invention, also a boron containing co-catalyst can be used instead of the aluminoxane co-catalyst or the aluminoxane co-catalyst can be used in combination with a boron containing co-catalyst.

It will be appreciated by the person skilled in the art that where boron based co-catalysts are employed, it is normal to pre-alkylate the complex by reaction thereof with an aluminium alkyl compound, such as TIBA. This procedure is well known and any suitable aluminium alkyl, e.g. $Al(C_1$-$C_6$ $alkyl)_3$ can be used. Preferred aluminium alkyl compounds are triethylaluminium, tri-isobutylaluminium, tri-isohexylaluminium, tri-n-octylaluminium and tri-isooctylaluminium.

Alternatively, when a borate co-catalyst is used, the metallocene catalyst complex is in its alkylated version, that is for example a dimethyl or dibenzyl metallocene catalyst complex can be used.

Boron based co-catalysts of interest include those of formula (VII)

$$BY_3 \quad \text{(VII)}$$

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are methyl, propyl, isopropyl, isobutyl or trifluoromethyl, unsaturated groups such as aryl or haloaryl like phenyl, tolyl, benzyl groups, p-fluorophenyl, 3,5-difluorophenyl, pentachlorophenyl, pentafluorophenyl, 3,4,5-trifluorophenyl and 3,5-di(trifluoromethyl) phenyl. Preferred options are trifluoroborane, triphenylborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(tolyl)borane, tris(3,5-dimethyl-phenyl)borane, tris(3,5-difluorophenyl)borane and/or tris (3,4,5-trifluorophenyl)borane.

Particular preference is given to tris(pentafluorophenyl) borane.

However it is preferred that borates are used, i.e. compounds containing a borate 3+ ion. Such ionic co-catalysts preferably contain a non-coordinating anion such as tetrakis (pentafluorophenyl)borate and tetraphenylborate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N, N-dimethylanilinium.

Preferred ionic compounds which can be used according to the present invention include:

triethylammoniumtetra(phenyl)borate,
tributylammoniumtetra(phenyl)borate,
trimethylammoniumtetra(tolyl)borate,
tributylammoniumtetra(tolyl)borate,
tributylammoniumtetra(pentafluorophenyl)borate,
tripropylammoniumtetra(dimethylphenyl)borate,
tributylammoniumtetra(trifluoromethylphenyl)borate,
tributylammoniumtetra(4-fluorophenyl)borate,
N,N-dimethylcyclohexylammoniumtetrakis(pentafluorophenyl)borate,
N,N-dimethylbenzylammoniumtetrakis(pentafluorophenyl)borate,
N,N-dimethylaniliniumtetra(phenyl)borate,
N,N-diethylaniliniumtetra(phenyl)borate,
N,N-dimethylaniliniumtetrakis(pentafluorophenyl)borate,
N,N-di(propyl)ammoniumtetrakis(pentafluorophenyl)borate,
di(cyclohexyl)ammoniumtetrakist(pentafluorophenyl)borate,
triphenylphosphoniumtetrakis(phenyl)borate,
triethylphosphoniumtetrakis(phenyl)borate,
diphenylphosphoniumtetrakis(phenyl)borate,
tri(methylphenyl)phosphoniumtetrakis(phenyl)borate,
tri(dimethylphenyl)phosphoniumtetrakis(phenyl)borate,
triphenylcarbeniumtetrakis(pentafluorophenyl)borate,
or ferroceniumtetrakis(pentafluorophenyl)borate.

Preference is given to triphenylcarbeniumtetrakis(pentafluorophenyl) borate,
N,N-dimethylcyclohexylammoniumtetrakis(pentafluorophenyl)borate or
N,N-dimethylbenzylammoniumtetrakis(pentafluorophenyl)borate.

It has been surprisingly found that certain boron co-catalysts are especially preferred. Preferred borates of use in the invention therefore comprise the trityl ion. Thus the use of N,N-dimethylammonium-tetrakispentafluorophenylborate and $Ph_3CB(PhF_5)_4$ and analogues therefore are especially favoured.

According to the present invention, the preferred co-catalysts are aluminoxanes, more preferably methylaluminoxanes, combinations of aluminoxanes with Al-alkyls, boron or borate co-catalysts, and combination of aluminoxanes with boron-based co-catalysts.

Suitable amounts of co-catalyst will be well known to the person skilled in the art.

The molar ratio of boron to the metal ion of the metallocene may be in the range 0.5:1 to 10:1 mol/mol, preferably 1:1 to 10:1, especially 1:1 to 5:1 mol/mol.

The molar ratio of Al in the aluminoxane to the metal ion of the metallocene may be in the range 1:1 to 2000:1 mol/mol, preferably 10:1 to 1000:1, and more preferably 50:1 to 500:1 mol/mol.

The catalyst can be used in supported or unsupported form, preferably in supported form. The particulate support material used is preferably an organic or inorganic material, such as silica, alumina or zirconia or a mixed oxide such as silica-alumina, in particular silica, alumina or silica-alumina. The use of a silica support is preferred. The person skilled in the art is aware of the procedures required to support a metallocene catalyst.

Especially preferably, the support is a porous material so that the complex may be loaded into the pores of the support, e.g. using a process analogous to those described in WO94/14856 (Mobil), WO95/12622 (Borealis) and WO2006/097497.

The average particle size of the silica support can be typically from 10 to 100 μm. However, it has turned out that special advantages can be obtained if the support has a median particle size d50 from 15 to 80 μm, preferably from 18 to 50 μm.

The average pore size of the silica support can be in the range 10 to 100 nm and the pore volume from 1 to 3 mL/g.

Examples of suitable support materials are, for instance, ES757 produced and marketed by PQ Corporation, Sylopol 948 produced and marketed by Grace or SUNSPERA DM-L-303 silica produced by AGC Si-Tech Co. Supports can be optionally calcined prior to the use in catalyst preparation in order to reach optimal silanol group content.

The use of these supports is routine in the art.

The Article

The present invention is further directed to an article comprising the nonwoven fabric (NF) as described above, wherein the article selected from the group consisting of filtration medium (filter), diaper, sanitary napkin, panty liner, incontinence product for adults, protective clothing, surgical drape, surgical gown, and surgical wear, comprising the inventive nonwoven fabric (NF).

It is preferred that the article of the present invention comprises the nonwoven fabric (NF) in an amount in the range from 90 to 100 wt.-%, more preferably in the range from 95 to 100 wt.-%, most preferably in the range from 99 to 100 wt.-%, relative to the total weight of the article.

All preferable embodiments described above may be applied mutatis mutandis to the article of the present invention.

EXAMPLES

A. Measuring Methods

The following definitions of terms and determination methods apply for the above general description of the invention including the claims as well as to the below examples unless otherwise defined.

Quantification of Microstructure by NMR Spectroscopy

Quantitative nuclear-magnetic resonance (NMR) spectroscopy was used to quantify the isotacticity and regio-regularity of the propylene homopolymers.

Quantitative $^{13}C\{1H\}$NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimized 10 mm extended temperature probehead at 125° C. using nitrogen gas for all pneumatics.

For propylene homopolymers approximately 200 mg of material was dissolved in 1,2-tetrachloroethane-$d_2$ (TCE- $d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra.

Quantitative $^{13}C\{1H\}$NMR spectra were processed, integrated and relevant quantitative properties determined from the integrals using proprietary computer programs.

For propylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

$$[mmmm]\% = 100 * (mmmm/\text{sum of all pentads})$$

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$$P_{21e} = (I_{e6} + I_{e8})/2$$

The amount of 1,2 primary inserted propene was quantified based on the methyl region with correction undertaken for sites included in this region not related to primary insertion and for primary insertion sites excluded from this region:

$$P_{12} = I_{CH3} + P_{12e}$$

The total amount of propene was quantified as the sum of primary inserted propene and all other present regio-defects:

$$P_{total} = P_{12} + P_{21e}$$

The mole percent of 2,1 erythro regio-defects was quantified with respect to all propene:

$$[21e]\text{mol-}\% = 100 * (P_{21e}/P_{total})$$

$MFR_2$ (230° C.) is measured according to ISO 1133 (230° C., 2.16 kg load)

Number Average Molecular Weight ($M_n$), Weight Average Molecular Weight ($M_w$) and Molecular Weight Distribution (MWD)

Molecular weight averages (Mw, Mn), and the molecular weight distribution (MWD), i.e. the Mw/Mn (wherein Mn is the number average molecular weight and Mw is the weight average molecular weight), were determined by Gel Permeation Chromatography (GPC) according to ISO 16014-4:2003 and ASTM D 6474-99. A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 µl. of sample solution were injected per analysis. The column set was calibrated using universal calibration (according to ISO 16014-2:2003) with at least 15 narrow MWD polystyrene (PS) standards in the range from 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

The xylene soluble fraction at room temperature (XS, wt.-%): The amount of the polymer soluble in xylene is determined at 25° C. according to ISO 16152; $5^{th}$ edition; 2005-07-01.

DSC analysis, melting temperature ($T_m$) and heat of fusion ($H_f$), crystallization temperature ($T_c$) and heat of crystallization ($H_c$): measured with a TA Instrument Q200 differential scanning calorimetry (DSC) on 5 to 7 mg samples. DSC is run according to ISO 11357/part 3/method $C_2$ in a heat/cool/heat cycle with a scan rate of 10° C./min in the temperature range of −30 to +225° C. Crystallization temperature ($T_c$) and heat of crystallization ($H_c$) are determined from the cooling step, while melting temperature ($T_m$) and heat of fusion ($H_f$) are determined from the second heating step.

The glass transition temperature Tg is determined by dynamic mechanical analysis according to ISO 6721-7. The measurements are done in torsion mode on compression-moulded samples (40×10×1 mm$^3$) between −100° C. and +150° C. with a heating rate of 2° C./min and a frequency of 1 Hz.

Grammage of the Nonwoven Fabric

The unit weight (grammage) of the nonwoven fabrics in g/m$^2$ was determined in accordance with ISO 536:1995.

Filament Fineness

The filament fineness in denier has been calculated from the average fibre diameter by using the following correlation:

$$\text{Fibre diameter (in cm)} = \left(4.444\times 10-6\times \text{denier}/0.91\times \pi\right)1/2$$

Mechanical Properties of the Nonwoven Fabric

The mechanical properties of the nonwoven fabrics were determined in accordance with EN 29073-3

(1989) "Test methods for nonwovens—Determination of tensile strength and elongation"

The tensile modulus was measured according to ISO 527-2 (cross head speed=1 mm/min; test speed 50 mm/min at 23° C.) using injection molded specimens as described in EN ISO 1873-2 (dog bone shape, 4 mm thickness). The measurement is done after 96 h conditioning time of the specimen.

Average Fibre Diameter in the Nonwoven Fabric

The number average fibre diameter was determined using scanning electron microscopy (SEM). A representative part of the web was selected and an SEM micrograph of suitable magnification was recorded, then the diameter of 20 fibres was measured and the number average calculated.

Hydrohead

The hydrohead or water resistance as determined by a hydrostatic pressure test is determined according to the WSP (wordwide strategic partners) standard test WSP 80.6 (09) as published in December 2009. This industry standard is in turn based on ISO 811:1981 and uses specimens of 100 cm$^2$ at 23° C. with purified water as test liquid and a rate of increase of the water pressure of 10 cm/min.

B. Examples

The catalyst used in the polymerization process for the inventive second propylene polymer (PP2) for the spunbonded layer (S) of the inventive example (E2) was Anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl] zirconium dichloride as disclosed in WO 2019/179959 A1 as MC-2. The supported metallocene catalyst was produced analogously to IE2 in WO 2019/179959 A1.

The catalyst used in the polymerization process for the comparative second propylene polymer (PP2) for the spunbonded layer (S) of the comparative example (E1) and for the first propylene polymer (PP1) used as the melt blown layer in all of the examples (E3) was prepared as follows:

Used Chemicals:

- 20% solution in toluene of butyl ethyl magnesium (Mg(Bu)(Et), BEM), provided by Chemtura
- 2-ethylhexanol, provided by Amphochem
- 3-Butoxy-2-propanol-(DOWANOL™ PnB), provided by Dow
- bis(2-ethylhexyl)citraconate, provided by SynphaBase
- $TiCl_4$, provided by Millenium Chemicals
- Toluene, provided by Aspokem
- Viscoplex© 1-254, provided by Evonik
- Heptane, provided by Chevron Preparation of a Mg Alkoxy Compound Mg alkoxide solution was prepared by adding, with stirring (70 rpm), into 11 kg of a 20 wt-% solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition, the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of $TiCl_4$ and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

The thus obtained catalyst was used along with triethylaluminium (TEAL) as co-catalyst and dicyclopentyl dimethoxy silane (D-Donor) as donor for E1 and cyclohexylmethyl dimethoxy silane (C-Donor) as donor for E3, respectively.

The aluminium to donor ratio, the aluminium to titanium ratio and the polymerization conditions are indicated in table 1.

TABLE 1

Preparation of base polymers E1, E2 and E3

| | | E1 | E2 | E3 |
|---|---|---|---|---|
| **Prepolymerization** | | | | |
| TEAL/Ti | [mol/mol] | 102 | n/a | 150 |
| TEAL/donor | [mol/mol] | 6 | n/a | 18.8 |
| Temperature | [° C.] | 30 | 20 | 20 |
| res.time | [h] | 0.3 | 0.3 | 18 |
| Donor | [—] | D | n/a | C |
| **Loop** | | | | |
| Temperature | [° C.] | 80 | 70 | 75 |
| Pressure | [kPa] | 5500 | 5500 | 3500 |
| Split | [%] | 60 | 55 | 100 |
| H2/C3 ratio | [mol/kmol] | 0.5 | 0.1 | 7.2 |
| C2/C3 ratio | [mol/kmol] | 1.2 | 1.8 | 0.0 |
| $MFR_2$ | [g/10 min] | 2.8 | 2.3 | 77.0 |
| XCS | [wt.-%] | 0.3 | 1.1 | 4.9 |
| **GPR 1** | | | | |
| Temperature | [° C.] | 80 | 80 | |
| Pressure | [kPa] | 2100 | 2100 | |
| Split | [%] | 40 | 45 | |

TABLE 1-continued

| Preparation of base polymers E1, E2 and E3 | | | | |
|---|---|---|---|---|
| | | E1 | E2 | E3 |
| H2/C3 ratio | [mol/kmol] | 8 | 1.8 | |
| C2/C3 ratio | [mol/kmol] | 0.4 | 9.8 | |
| Properties of final base polymer | | | | |
| $MFR_2$ | [g/10 min] | 2.3 | 2.3 | 79 |
| XCS | [wt.-%] | 3.1 | 0.6 | 4.9 |
| C2 | [wt.-%] | 0.3 | 0.3 | 0.0 |
| Mw | [kg/mol] | 328 | 315 | 140 |
| Mw/Mn | [—] | 8 | 2.8 | 6.5 |
| Tm | [° C.] | 160 | 151 | 163 |
| Tg | [° C.] | −0.5 | 0.6 | 0.0 |
| Tc | [° C.] | 116 | 114 | 122 |
| 2, 1 | [mol-%] | 0.0 | 0.84 | 0.0 |
| mmmm | [%] | 95.3 | 99.4 | 93.5 |

The polymers E1, E2 and E3 have been mixed with 400 ppm calcium Stearate (CAS No. 1592-23-0) and 1,000 ppm Irganox 1010 supplied by BASF AG, Germany (Pentaerythrityl-tetrakis(3-(3',5'-di-tert. butyl-4-hydroxyphenyl)-propionate, CAS No. 6683-19-8).

In a second step the polymers E1, E2 and E3 have been visbroken by using a co-rotating twin-screw extruder at 200-230° C. and using an appropriate amount of (tert-butylperoxy)-2,5-dimethylhexane (Trigonox 101, distributed by Akzo Nobel, Netherlands) to achieve the target $MFR_2$. The properties of the propylene homopolymers after visbreaking are summarized in table 2.

TABLE 2

| Properties of the inventive and comparative examples after visbreaking | | | | |
|---|---|---|---|---|
| | | Spunbonded (S) | | Melt blown (M) |
| | | CE | IE | RE |
| Isotacticity(mmmm) | [%] | 95.3 | 99.4 | 93.5 |
| C2 content | [wt.-%] | 0.3 | 0.3 | 0.0 |
| MFR final | [g/10 min] | 27 | 27 | 1200 |
| Mw/Mn | [—] | 4.7 | 2.4 | 3.8 |
| XCS | [wt.-%] | 3.5 | 0.8 | 4.8 |
| 2, 1 regio defects | [%] | 0.0 | 0.84 | 0.0 |
| Tg | [° C.] | −0.3 | 0.5 | 0.0 |
| Tm | [° C.] | 162 | 152 | 158 |
| Tc | [° C.] | 115 | 110 | 122 |

n.d. = not detected
n.a. = not applicable

The nonwoven fabrics were produced on a Reifenhäuser Reicofil RF5 semi-commercial line, equipped with spunbond (S-Extruder 1)—spunbond (S-Extruder 2)—Melt blown (M-Extruder 1)—Melt blown (M-Extruder 2)—spunbond (S-Extruder 3) beams. The machine is adjusted by the person skilled in the art to reach the target setting. The key parameters are listed in Table 3. Each product has 11.0 $g/m^2$ of spunbonded layers and 2.0 $g/m^2$ of melt blown layers, with each individual spundbonded layer having a grammage of 3.67 $g/m^2$, and each individual melt blown layer having a grammage of 1.0 $g/m^2$.

TABLE 3

| Processing conditions for the production and properties of the nonwoven fabrics | | | |
|---|---|---|---|
| Example | | CE | IE |
| S-Extruder 1 | | | |
| Material | [—] | E1 | E2 |
| Melt temperature | [° C.] | 262 | 266 |
| Pressure | [Pa] | 4500 | 7200 |
| Throughput | [kg/h] | 170 | 170 |
| S-Extruder 2 | | | |
| Melt temperature | [° C.] | 263 | 267 |
| Pressure | [Pa] | 4800 | 7000 |
| Throughput | [kg/h] | 170 | 170 |
| M-Extruder 1 | | | |
| Material | [—] | E3 | E3 |
| DCD | [mm] | 99 | 99 |
| Melt temperature | [° C.] | 261 | 261 |
| Throughput | [kg/h] | 36 | 36 |
| M-Extruder 2 | | | |
| DCD | [mm] | 109 | 109 |
| Melt temperature | [° C.] | 261 | 261 |
| Throughput | [kg/h] | 36 | 36 |
| S-Extruder 3 | | | |
| Material | [—] | E1 | E2 |
| Melt temperature | [° C.] | 262 | 265 |
| Pressure | [Pa] | 3600 | 6500 |
| Throughput | [kg/h] | 170 | 170 |
| Fabric performance | | | |
| Grammage | [$g/m^2$] | 13.0 | 13.0 |
| Spunbonded fibre diameter | [μm] | 14.1 | 12.9 |

The multilayer nonwoven fabric thus obtained was run through calender rolls to bind the layers. A number of comparative nonwoven fabrics and a number of inventive nonwoven fabrics were processed at different calender temperatures, then the properties of these nonwoven fabrics were evaluated as a function of calender temperature.

As can be seen from FIG. 1, the hydrohead (HH) and the tensile strength in the crossmachine direction (F-CD) of the nonwoven fabrics showed a dependence on the calender temperature. Whilst the HH decreased significantly at higher calender temperatures, the inventive nonwoven fabrics maintained high HH at much greater calender temperatures, before finally starting to decrease at calender temperatures of over 165° C. (in contrast to the comparative nonwoven fabrics that started to notably decrease at temperatures over 150° C. The F-CD of both compositions increased with increasing calender temperature for both examples, however the values measured for the inventive nonwoven fabrics were superior to those of the comparative nonwoven fabrics at all temperatures.

Consequently, it can be concluded that both the mechanical and the barrier properties of the inventive nonwoven fabrics are superior to those of the comparative nonwoven fabrics, especially at higher calender temperatures. Furthermore, the grammage of the nonwoven fabrics is low, helping to avoid undue impact on the environment when these nonwoven fabrics are employed in hygiene articles.

The invention claimed is:

1. A nonwoven fabric (NF), comprising a multilayer structure that comprises:

i) at least one melt blown layer (M) comprising melt blown fibers (MBF) comprising a first propylene polymer (PP1) having:

a) an amount of 2,1-regiodefects, as determined by 13C-NMR spectroscopic analysis, in the range from 0.0 to 0.1 mol-%; and b) a melting temperature Tm, determined by differential scanning calorimetry (DSC), in the range from 155 to 170° C., ii) at least one spunbonded layer(S) comprising spunbonded fibers (SBF) comprising a second propylene polymer (PP2) having:

a) an amount of 2,1-regiodefects, as determined by 13C-NMR spectroscopic analysis, in the range from 0.45 to 1.5 mol-%; and b) a melting temperature Tm, determined by differential scanning calorimetry (DSC), in the range from 145 to 160° C., wherein the second propylene polymer (PP2) has been polymerized in the presence of a single site catalyst, wherein the melting temperature of the first polypropylene polymer Tm (PP1) is at least 5.0° C. higher than that of the second first polypropylene polymer Tm (PP2), and wherein the nonwoven fabric has a hydrohead of at least 100 mbar.

2. The nonwoven fabric (NF) according to claim 1, wherein the total grammage of the one or more melt blown layers (M), determined according to ISO 536:1995, is in the range from 0.8 to 30 g/m$^2$, and/or the total grammage of the one or more spunbonded layers(S), determined according to ISO 536:1995, is in the range from 5.0 to 100 g/m$^2$.

3. The nonwoven fabric (NF) according to claim 1, wherein the first propylene polymer (PP1) and/or the second propylene polymer (PP2) are propylene homopolymers or propylene ethylene copolymers wherein the ethylene content, as determined by $^1$H-NMR spectroscopic analysis, is less than 0.5 mol-%.

4. The nonwoven fabric (NF) according to claim 1, wherein the first propylene polymer (PP1) has at least one of the following properties:

a) a melt flow rate ($MFR_2$), measured according to ISO 1133 at 230° C. and 2.16 kg in the range from 450 to 200 g/10 min; and b) a molecular weight distribution (Mw/Mn), determined by Gel Permeation Chromatography, in the range from 2.5 to 5.0.

5. The nonwoven fabric (NF) according to claim 1, wherein the second propylene polymer (PP2) has at least one of the following properties:

a) a melt flow rate ($MFR_2$), measured according to ISO 1133 at 230° C. and 2.16 kg in the range from 5.0 to 50 g/10 min; and b) a molecular weight distribution (Mw/Mn), determined by Gel Permeation Chromatography, in the range from 2.0 to 4.5.

6. The nonwoven fabric (NF) according to claim 1, wherein the second propylene polymer (PP2) has a xylene cold soluble content (XCS) determined according to ISO 16152, in the range from 0.1 to 2.0 wt.-%.

7. The nonwoven fabric (NF) according to claim 1, wherein the first propylene polymer (PP1) has been visbroken.

8. The nonwoven fabric (NF) according to claim 1, wherein the second propylene polymer (PP2) has been visbroken.

9. The nonwoven fabric (NF) according to claim 1, wherein the first propylene polymer (PP1) has been polymerized in the presence of:

a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound b) optionally a co-catalyst (Co), and c) optionally an external donor (ED).

10. The nonwoven fabric (NF) according to claim 1, wherein the multilayer structure comprises the following layers in the given order:

at least one spunbonded layer(S) comprising spunbonded fibers(S);

at least one melt blown layer (M) comprising melt blown fibers (M); and at least one spunbonded layer(S) comprising spunbonded fibers(S), wherein each instance of the spunbonded layer(S) may be the same or different and each instance of the melt blown layer (M) may be the same or different.

11. A process for producing the nonwoven fabric (NF) according to claim 10, comprising:

a) producing the first spunbonded layer (S1) by depositing spunbonded fibers (SBF) through a spinneret, b) optionally producing at least one further spunbonded layer(S) by depositing spunbonded fibers (SBF) on the first spunbonded layer (S1) obtained in step a) through at least one further spinneret, thereby obtaining a multilayered structure comprising two or more spunbonded layers(S) in sequence, c) producing the first melt blown layer (M1) by depositing melt blown fibers (MBF) on the first spunbonded layer (S1) obtained in step a) or on the outermost spunbonded layer(S) obtained in step b) through an extruder, thereby obtaining a multilayered structure comprising one or more spunbonded layer(s) (S) and a melt blown layer (M) in sequence, d) optionally producing at least one further melt blown layer (M) by depositing melt blown fibers (MBF) on the first melt blown layer (M1) obtained in step c) through at least one further extruder, thereby obtaining a multilayered structure comprising one or more spunbonded layer(s) (S) and two or more melt blown layer(s) (M) in sequence, e) producing the second spunbonded layer (S2) by depositing spunbonded fibers (SBF) through a spinneret on the first melt blown layer (M1) obtained in step c) or on the outermost melt blown layer (M) obtained in step d), thereby obtaining a multilayered structure comprising one or more spunbonded layer(s) (S), one or more melt blown layer(s) (M), and one spunbonded layer(S) in sequence, and f) optionally producing at least one further spunbonded layer(S) by depositing spunbonded fibers (SBF) on the second spunbonded layer (S2) obtained in step e) through at least one further spinneret, thereby obtaining a multilayered structure comprising one or more spunbonded layer(s) (S), one or more melt blown layer(s) (M), and two or more spunbonded layer(s) (S) in sequence.

12. The nonwoven fabric according to claim 1, obtainable via the process of claim 11.

13. An article, comprising the nonwoven fabric (NF) according to claim 1, wherein the article is selected from filtration medium (filter), diaper, sanitary napkin, panty liner, incontinence product for adults, protective clothing, surgical drape, surgical gown, and surgical wear.

14. The nonwoven fabric according to claim 7, wherein the first propylene polymer (PP1) fulfils either of inequation (I) or inequation (II):

$$7.0 < (MFR(\text{final}))/(MFR(\text{initial})) < 30.0 \quad \text{(I)}$$

wherein MFR (final) is the melt flow rate $MFR_2$ (230° C.) determined according to ISO 1133 after visbreaking and MFR (initial) is the melt flow rate $MFR_2$ (230° C.) determined according to ISO 1133 before visbreaking; and $$1.30 < (MWD(\text{initial}))/(MWD(\text{final})) < 2.00 \quad \text{(II)}$$

wherein MWD (final) is the molecular weight distribution (Mw/Mn), determined by Gel Permeation Chromatography, after visbreaking and MWD (initial) is the molecular weight distribution (Mw/Mn), determined by Gel Permeation Chromatography, before visbreaking.

15. The nonwoven fabric (NF) according to claim 8, wherein the second propylene polymer (PP2) fulfils either of inequation (III) or inequation (IV):

$$5.0 < (MFR(\text{final}))/(MFR(\text{initial})) < 20.0 \quad \text{(III)}$$

wherein MFR (final) is the melt flow rate $MFR_2$ (230° C.) determined according to ISO 1133 after visbreaking and MFR (initial) is the melt flow rate $MFR_2$ (230° C.) determined according to ISO 1133 before visbreaking; and $$1.05 < (MWD(\text{initial}))/(MWD(\text{final})) < 1.50 \quad \text{(IV)}$$

wherein MWD (final) is the molecular weight distribution (Mw/Mn), determined by Gel Permeation Chromatography, after visbreaking and MWD (initial) is the molecular weight distribution (Mw/Mn), determined by Gel Permeation Chromatography, before visbreaking.

16. The nonwoven fabric (NF) according to claim 1, wherein the single site catalyst comprises:

(i) a metallocene complex of the general formula (V)

Formula (V)

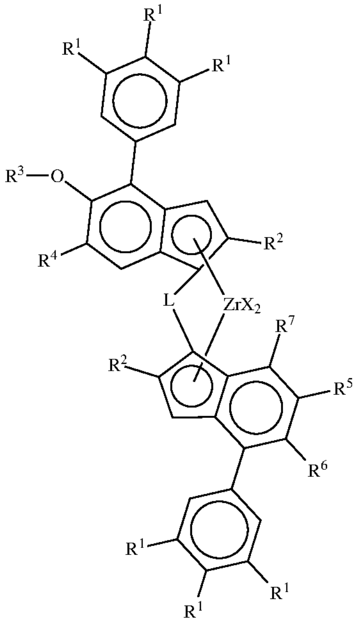

wherein each X independently is a sigma-donor ligand,

L is a divalent bridge selected from $—R'_2C—$, $—R'_2C—CR'_2—$, $—R'_2Si—$, $—R'_2Si—SiR'_2—$, $—R'_2Ge—$, wherein each R' is independently a hydrogen atom or a $C_1$-$C_{20}$-hydrocarbyl group optionally containing one or more heteroatoms from groups 14-16 of the periodic table or fluorine atoms, or optionally two R' groups taken together can form a ring, each $R^1$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group, and optionally two adjacent $R^1$ groups can be part of a ring including the phenyl carbons to which they are bonded, each $R^2$ independently are the same or can be different and are a $CH_2$-$R^8$ group, with $R^8$ being H or linear or branched $C_{1-6}$-alkyl group, $C_{3-8}$-cycloalkyl group, $C_{6-10}$-aryl group, $R^3$ is a linear or branched $C_1$-$C_6$-alkyl group, $C_{7-20}$-arylalkyl, $C_{7-20}$-alkylaryl group or $C_6$-$C_{20}$-aryl group, $R^4$ is a C $(R^9)_3$ group, with $R^9$ being a linear or branched $C_1$-$C_6$-alkyl group, $R^5$ is hydrogen or an aliphatic $C_1$-$C_{20}$-hydrocarbyl group optionally containing one or more heteroatoms from groups 14-16 of the periodic table;

$R^6$ is hydrogen or an aliphatic $C_1$-$C_{20}$-hydrocarbyl group optionally containing one or more heteroatoms from groups 14-16 of the periodic table; or $R^5$ and $R^6$ can be taken together to form a 5 membered saturated carbon ring which is optionally substituted by n groups $R^{10}$, n being from 0 to 4;

each $R^{10}$ is same or different and may be a $C_1$-$C_{20}$-hydrocarbyl group, or a $C_1$-$C_{20}$-hydrocarbyl group optionally containing one or more heteroatoms belonging to groups 14-16 of the periodic table;

$R^7$ is H or a linear or branched $C_1$-$C_6$-alkyl group or an aryl or heteroaryl group having 6 to 20 carbon atoms optionally substituted by one to three groups $R^{11}$, each $R^{11}$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group, (ii) a co-catalyst system comprising a boron containing co-catalyst and/or an aluminoxane co-catalyst, and (iii) a silica support.

* * * * *